United States Patent
Beresnev et al.

(10) Patent No.: US 11,762,149 B1
(45) Date of Patent: Sep. 19, 2023

(54) FIBER OPTIC COLLIMATOR WITH A BEVELED FIBER ENDCAP

(71) Applicant: U.S. Army DEVCOM, Army Research Laboratory, Adelphi, MD (US)

(72) Inventors: Leonid A. Beresnev, Dayton, MD (US); David A. Ligon, Columbia, MD (US); Angel S. Flores, Albuquerque, NM (US); Mark Dubinskiy, Olney, MD (US); Kristan P. Gurton, Olney, MD (US); Chatt C. Williamson, Mt. Airy, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 22 days.

(21) Appl. No.: 17/712,207

(22) Filed: Apr. 4, 2022

(51) Int. Cl.
 *G02B 6/26* (2006.01)
 *G02B 6/34* (2006.01)
(52) U.S. Cl.
 CPC .............. *G02B 6/262* (2013.01); *G02B 6/34* (2013.01)

(58) Field of Classification Search
 CPC . G02B 6/04; G02B 6/262; G02B 6/32; G02B 6/34
 See application file for complete search history.

(56) References Cited

U.S. PATENT DOCUMENTS

2004/0081407 A1\* 4/2004 Kopf ................... G02B 6/3827
                                                                 385/77
2020/0408992 A1\* 12/2020 Iwama ............... B23K 26/0604

\* cited by examiner

*Primary Examiner* — Michael P Mooney
(74) *Attorney, Agent, or Firm* — Alan I. Kalb

(57) ABSTRACT

A method and apparatus for controlling propagation of a light beam using a beveled endcap of an optical fiber, where the endcap has a first end coupled to the optical fiber and a second end having a bevel that circumscribes a facet. The bevel has an angle relative to the plane of the facet that directs a peripheral portion of the light beam towards a lens and the facet directs a central portion of the light beam towards the lens. As such, the light beam is collimated with substantially all of the power of the light beam propagating through the lens and all the power delivered with fiber core to the output endcap is propagating through the lens despite the divergence of the delivered beam and a restricted aperture of the lens.

20 Claims, 14 Drawing Sheets

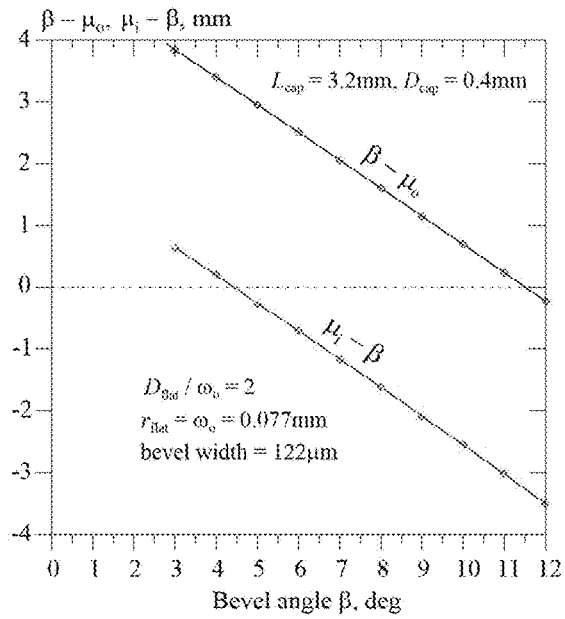
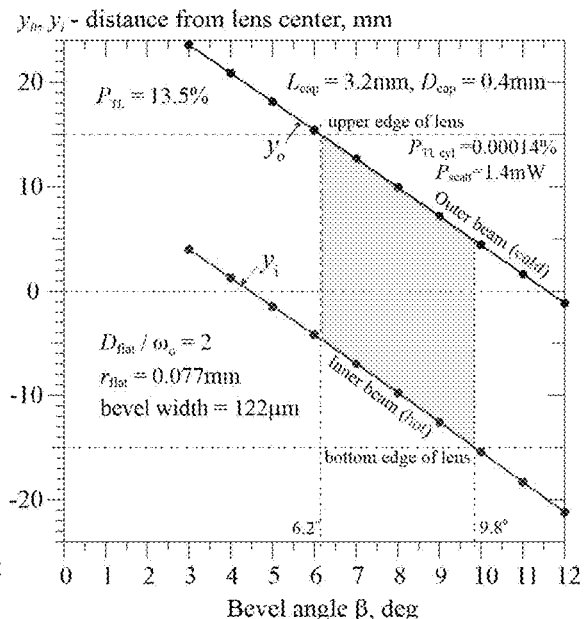
FIG. 5A  FIG. 5B
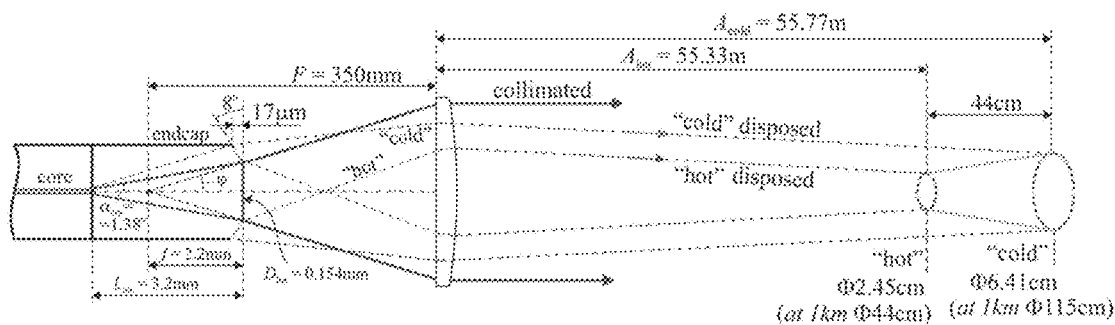
FIG. 6

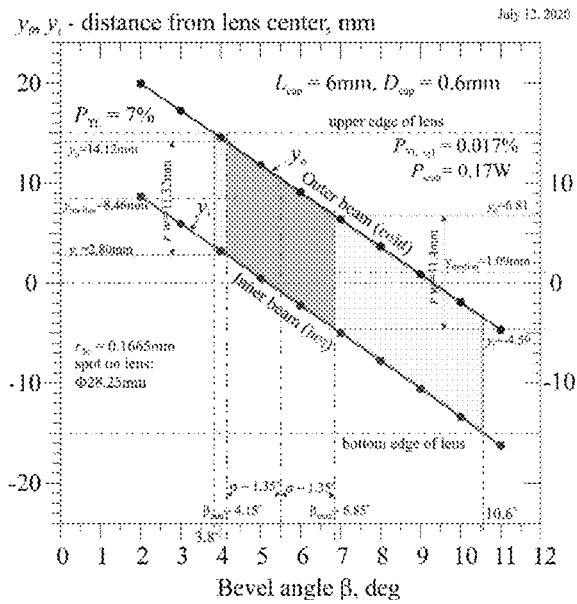
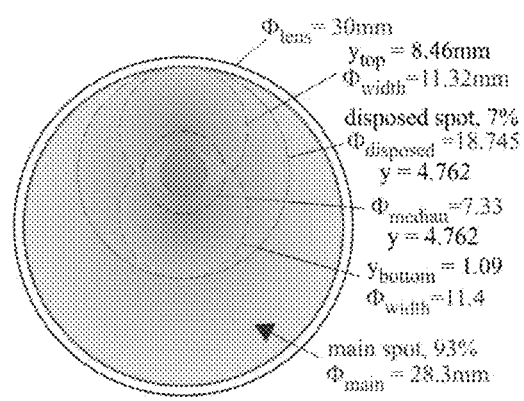
FIG. 22A  FIG. 22B
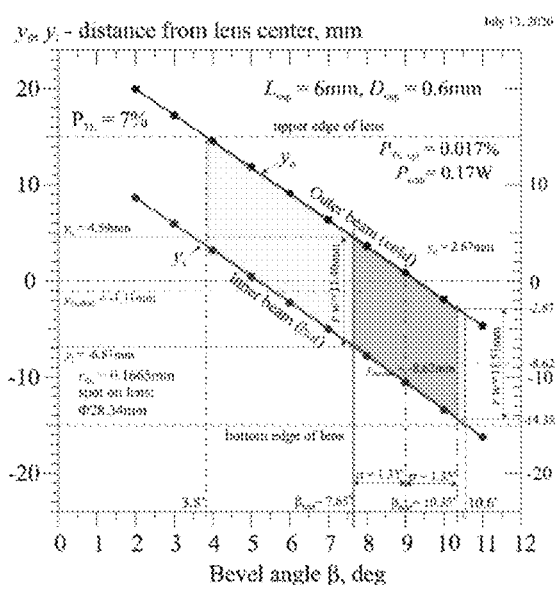
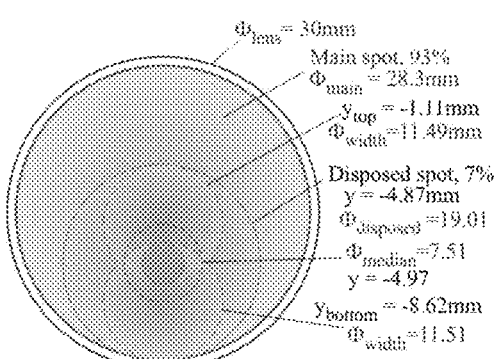
FIG. 23A  FIG. 23B

FIBER OPTIC COLLIMATOR WITH A BEVELED FIBER ENDCAP

GOVERNMENT INTEREST

The invention described herein may be manufactured, used and licensed by or for the U.S. Government.

BACKGROUND

Field

Embodiments of the present invention generally relate to fiber optic collimators and, more specifically, to a fiber optic collimator with a beveled fiber endcap.

Description of the Related Art

Fiber lasers have become the main source of laser radiation in numerous modern applications. Very high efficiency (about 40%) and almost ideal beam quality, where $M^2<1.1$, enable fiber lasers to be used in compact, free-space transmitters for industry, medical, military, free-space optical communications, etc.

A fiber optic transmitter comprises an optical collimator composed from a delivery fiber having an emitting facet on a distal end and an output collimating lens, where the emitting facet is placed near the focus of lens. By varying the emitting facet location near the focal plane, the collimated beam can be controlled. For example, displacing the fiber tip (an X-Y displacement) controls the azimuth-elevation deviations of the collimated beam. Additionally, changing the distance between the emitting facet and the focal plane controls the focus-defocus of collimated beam. These displacements should be very fast to mitigate the beam wander during propagation through turbulent air. For typical displacement speed on the order of many kHz, the mass of an emitting tip should be very small, on the order of tens milligrams.

Due to the beam emitted from fiber emitting facet having an intensity profile close to a Gaussian shape, the output collimating lens truncates a fraction of a peripheral portion of the beam. This truncated portion of the beam may scatter and impact the operation of equipment (e.g., LIDAR receivers) that are sensitive to such parasitic radiation. In high powered laser applications, especially in multi-channel fiber arrays with restricted apertures of output collimating lenses the truncated portion of the beam can deliver significant power and may heat components within the transmitter or require additional components to absorb or radiate the heat.

Therefore, there is a need in the art for an improved fiber optic collimator capable for use in high power laser applications.

SUMMARY

Embodiments of the present invention include a fiber optic collimator with a beveled fiber endcap.

BRIEF DESCRIPTION OF THE DRAWINGS

So that the manner in which the above recited embodiment of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A and 5B depict the behavior of "cold" and "hot" beams plotted in dependence on the bevel angle β, Embodiment 1;

FIG. 6 depicts a schematic view of the collimator of FIG. 1 and the focal distance for the beams that are handled by the beveled edge of the endcap;

FIG. 22A depicts the location of $y_o$, $y_i$ of the "cold" and "hot" beams plotted in dependence on bevel angle β for Embodiment 11 of the collimator of FIG. 20;

FIG. 22B depicts the spot diameter created by Embodiment 11 with bevel angle Q equal to 5.5 degrees;

FIG. 23A depicts the location of $y_o$, $y_i$ of the "cold" and "hot" beams plotted in dependence on bevel angle β for Embodiment 11 of the collimator of FIG. 20; and FIG. 23B depicts the spot diameter created by Embodiment 11 with bevel angle Q equal to 9.0 degrees.

DETAILED DESCRIPTION

Figure 1A:
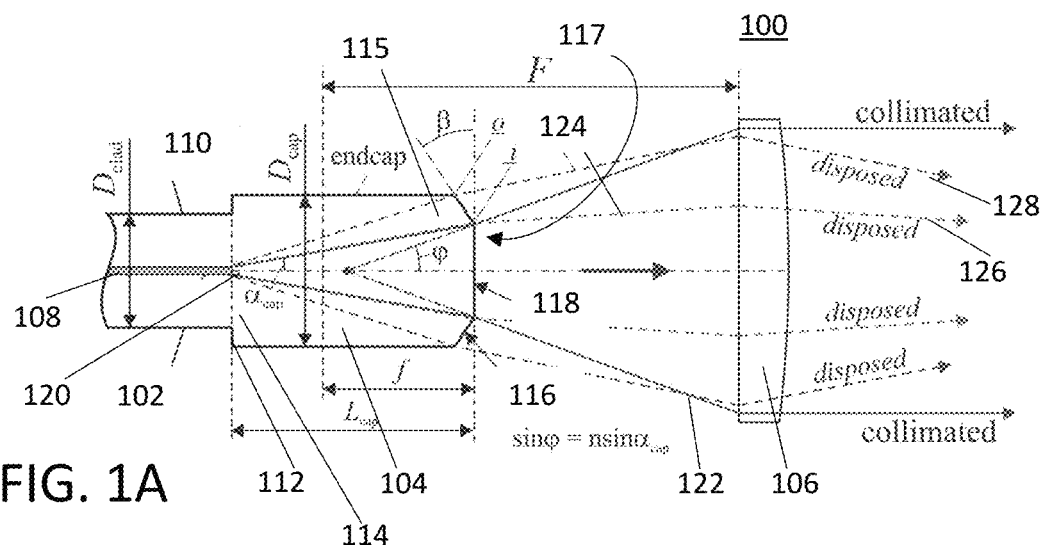
FIGS. 1A, 1B, 1C and 1D (FIGS. 1A-D) depicts a collimator in accordance with an embodiment of the present invention.

Embodiments of the present invention include a collimator comprising a delivery optical fiber terminated with a beveled endcap and a lens. The delivery fiber comprises a cladding surrounding a core. The delivery fiber is constructed to propagate high powered laser light (a beam) to the endcap. The endcap comprises a first end and a second end, where the first end is coupled to a distal end of the delivery fiber and the second end comprises a bevel at the circumferential edge of the endcap. The bevel circumscribes a central region (a facet) such that the bevel redirects a peripheral portion of a light beam propagated by the fiber to the endcap, where the redirected light would otherwise form parasitic losses into the lens. Consequently, substantially all of the light within the beam is collimated and transmitted through the lens toward a target. Operational characteristics of the collimator may be altered by varying the bevel size, shape of the endcap, angle of the facet, length of the endcap, width of the endcap, and the like. A movable fiber tip of collimator as described herein is low in mass (e.g., weighs less than 5 mg) and can be manipulated (i.e., mechanically moved) at high frequencies (e.g., 5 KHz or more) to redirect the beam.

FIGS. 1A-D depict a collimator 100 in accordance with an embodiment of the present invention. One embodiment of the collimator 100 comprises a delivery fiber 102, an endcap 104 and a lens 106. The delivery fiber 102 comprises a core 108 surrounded by a cladding 110 such that the delivery fiber propagates a high-power laser beam to the distal end 112 of the delivery fiber 102 and into the endcap 104.

The endcap 104 comprises an entry portion (a first end 114) and a second end 115 having a facet 117 comprising a bevel 116 that surrounds a flat central area (flat portion 118). The first end 114 is spliced to the distal end 112 of the fiber 102 using a conventional high-temperature fusion technique. A divergent light beam 120 is emitted from the end of the core 108. The light beam 120 comprises a main beam 122 (solid lines) and beam tails 124 (dashed lines), where the beam tails 124, after passing through the endcap, comprise an inner portion 126 and an outer portion 128. As depicted in FIG. 1A, the bevel 116 redirects the tails 124 (both portions 126 and 128) into the lens 106 such that the beam tails 124 are disposed along the main beam 122 and nearly all of the beam emitted from the facet 117 is collimated and directed toward a target 130. The main fraction $P_m$ of beam (global maximum), emitted from flat portion 118 of facet 117 is focused on a target into diffraction limited spot, determined with an aperture of the lens 106.

Table 1 describes the parameters of single collimator with circular output lens and circular flat portion 118 of facet with diameter $d_{flat}$ which transmit the global maximum of the Gaussian beam. The truncated fraction $P_{TL}$ is determined with a diameter of emitting flat area of the facet 117 and redirects the tails 124 into the lens 106. Truncation fraction $P_{TL}$ of the Gaussian beam tails is dependent on the facet aperture d and the endcap length L, where $P_{TL}=\exp[-(d/\omega_o)^2/2]$. Thus, for a given $P_{TL}$, the diameter $d=\omega_o(-2\ln P_{TL})^{1/2}$.

In one exemplary embodiment, the endcap has L=3.2 mm and diameter 400 μm. The last column of Table 1 shows the length of endcap L having flat circular facet of diameter 0.4 mm which truncates a given 0% of full power shown in first column.

TABLE 1

|  | $d/\omega_0$ | $P_{TL}$ | % of full | Spot diameter on facet, $d_{flat}$, of endcap L = 3.2 mm | beam divergence in endcap, $\alpha_{cap}$ | length of endcap for MFD = 19.5 μm and facet dia D = 400 μm with given $P_{TL}$ |
|---|---|---|---|---|---|---|
| 13.5% | 2 | 0.135335 | 13.53% | 154 μm | 1.38°, Gauss | 8.30 mm |
| 10% | 2.14 | 0.101287 | 10.13 | 165.2 μm | 1.48° | 7.74 mm |
|  | 2.146 | 0.10 | 10% | 165.2 μm | 1.479° | 7.75 mm |
|  | 2.15 | 0.099137 | 9.91 |  |  |  |
| 7% | 2.3 | 0.071005 | 7.10 |  |  |  |
|  | 2.306 | 0.07 | 7% | 177.58 μm | 1.588° | 7.21 mm |
|  | 2.31 | 0.069387 | 6.94 | 177.6 μm | 1.591° | 7.20 mm |
| 5% | 2.44 | 0.050956 | 5.096% |  |  |  |
|  | 2.448 | 0.05 | 5% | 188.48 μm | 1.685° | 6.80 mm |
|  | 2.45 | 0.049725 | 4.97 | 188.5 μm | 1.689° | 6.78 mm |
| 1% | 3.03 | 0.010148 | 1.01 | 233.7 μm | 2.094° | 5.47 mm |
|  | 3.035 | 0.01 | 1% | 233.68 μm | 2.088° | 5.49 mm |
|  | 3.04 | 0.009845 | 0.98 |  |  |  |
| 0.1% | 3.71 | 0.001026 | 0.103 |  |  |  |
|  | 3.717 | 0.001 | 0.1% | 286.2 μm | 2.555° | 4.48 mm |
|  | 3.72 | 0.000989 | 0.099 | 286.2 μm | 2.565° | 4.46 mm |
| 0.05% | 3.89 | 0.000518 | 0.052 |  |  |  |
|  | 3.899 | 0.0005 | 0.05% | 300.2 μm | 2.686° | 4.263 mm |
|  | 3.90 | 0.000498 | 0.050 | 300.2 μm | 2.690° | 4.257 mm |

TABLE 1-continued

| $d/\omega_0$ | $P_{TL}$ | % of full | Spot diameter on facet, $d_{flat}$, of endcap L = 3.2 mm | beam divergence in endcap, $\alpha_{cap}$ | length of endcap for MFD = 19.5 μm and facet dia D = 400 μm with given $P_{TL}$ |
|---|---|---|---|---|---|
| 0.034% | 4 | 0.000335 | 0.034 | 308.0 μm | 2.749° |
| 0.01% | 4.292 | 0.0001 | 0.01% | 330.48 μm | 2.962° | 3.87 mm |
| 0.001% | 4.799 | 0.00001 | 0.001% | 369.52 μm | 3.294° | 3.46 mm |
| 0.00018% | 5.143 | 0.0000018 | 0.00018 | 396 μm | 3.528° | 3.244 mm |
| 0.00016 | 5.166 | 0.0000016 | | 398 μm | 3.543° | 3.23 mm |
| 0.00014 | 5.195 | 0.00000138 | 0.00014 | 400 μm | 3.561° | 3.21 mm |
| 0.0001% | 5.257 | 0.000001 | 0.0001% | 405 μm | 3.604° | 3.175 mm |

In FIG. 1, the detailed geometry of the collimator 100 is shown with definitions of such parameters of the endcap 104 as: length $L_{cap}$, diameter $D_{cap}$, angle of the bevel β, radius $r_{flat}$ of the beam incident upon the facet 117, angle $\alpha_{cap}$ between optical axis and the beam incident upon internal edge i of bevel 116, "Gaussian" radius $\omega_o$ of a beam spot on the facet with $1/e^2$ fraction of full power P of the beam outside of this spot (truncation $P_{TL}$=13.53%). Angle φ defines the geometry of divergence of the central fraction of the beam which is incident upon the lens 106 and is calculated from relation n sin $\alpha_{cap}$=sin φ, n=1.45 is a refractive index of fused silica.

Herein $y_o$ and $y_i$ indicate the location of beams coming from the outer edge o and from the inner edge i on the lens, respectively. See details in FIGS. 1B and 1C. The outer beam o is referred to as a "cold" beam and the inner beam i is referred to as a "hot" beam, because the power density on bevel exponentially decreases at increase of distance r from the facet center to the emitting point on the facet in both the flat area and the bevel angled area.

In one embodiment, the delivery fiber is model LMA-400/25 available from Nufern having a cladding diameter of 400 μm, and a waveguiding core diameter of 25 μm. Most of the experiments using embodiments of the collimator 100 were accomplished with a fiber having a mode field diameter MFD=19.5 μm. The free-space divergence of a beam emitted using such a fiber is characterized with angle $2\varphi=2\alpha_G=4.00°$ determined from the relation $\varphi=\alpha_{Gauss}=2\lambda/\pi MFD$, where λ=1.07 μm is a wavelength of the fiber laser using a Ytterbium-doped gain core. These lasers enabled the power emitted from embodiments of the end-capped delivery fibers to reach about 1.99 kW or higher.

Figure 1B:
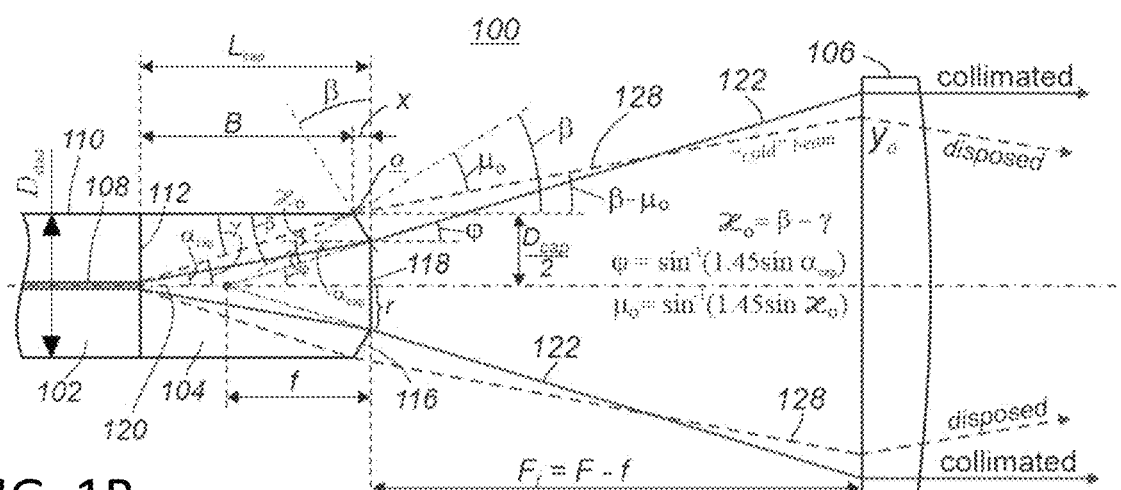
Figure 1C:
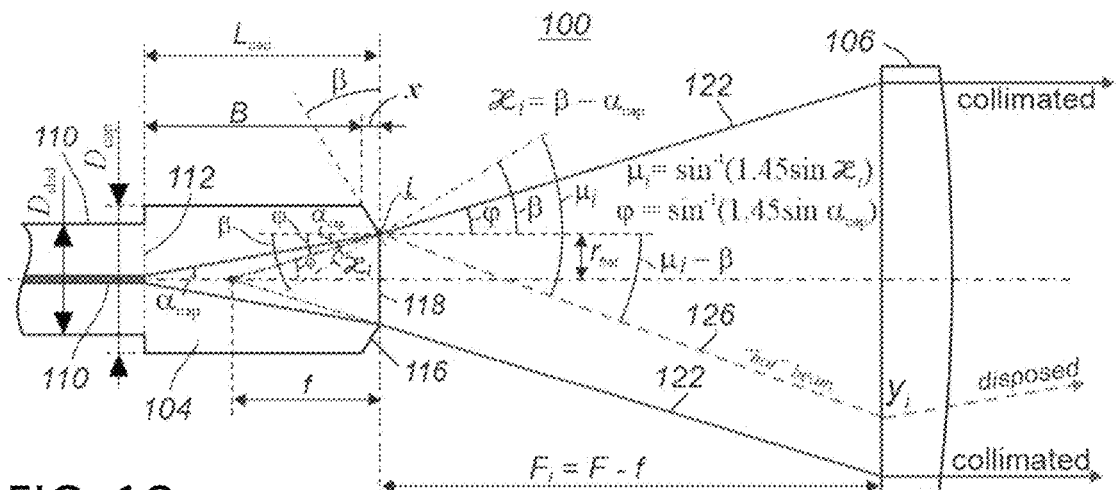
Figure 1D:
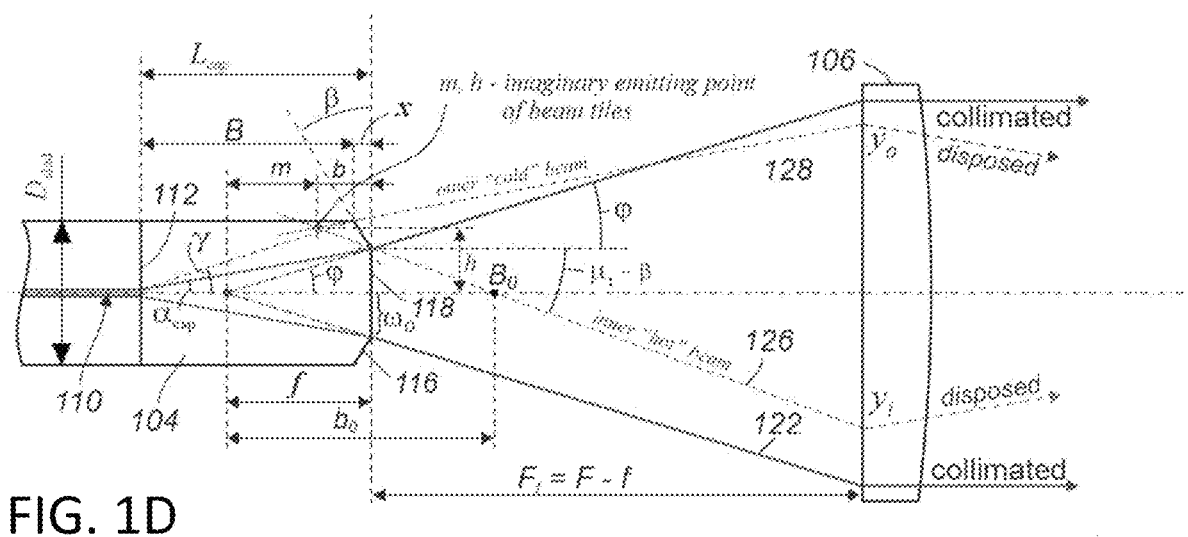
Figure 2:
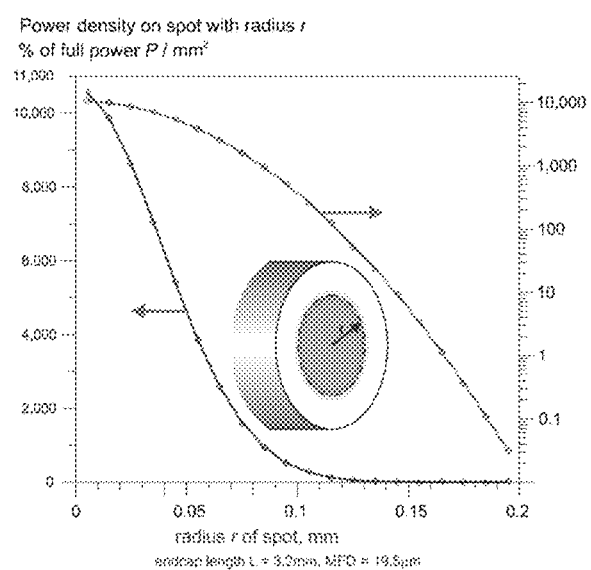
FIG. 2 depicts a graph of an average power density as a percentage of full power P versus a size of a main beam spot on the facet of the collimator of FIG. 1.

FIG. 2 depicts a graph of an average power density as a percentage of full power P versus a main beam spot size on the facet 117 of the collimator 100 of FIG. 1.

The power density on a facet strongly decreases with increase of deviation r from optical axis of a Gaussian beam. In Table 2, the power density is calculated for particular endcap dimensions, diameter $D_{cap}$=400 μm and length $L_{cap}$=3.2 mm, said endcap is fused with distal end of the delivery fiber having, for example, an MFD=19.5 μm. The flat area of the facet has radius $r_{flat}=\omega_o$, $P_{TL}$=13.5%. The width of bevel=0.123 mm and the power density on inner edge i of facet is >40000 times larger than on outer edge o.

TABLE 2

| r, mm | $d/\omega_0$, $2r/0.077$ | $P_F$, % | $P_{TL}$, % | $r_m$, median radius | $\Delta P_{TL}$, % in circle with width 10 μm | $\pi r^2$ circle area, (mm²) | A, _ring area, (mm²) | %/A, (%/mm²) |
|---|---|---|---|---|---|---|---|---|
| 0.200 | 5.195 | 99.9999 | 0.0001381 | | | 0.12566 | | |
| | | | | 0.195 | 0.000376 | | 0.01225 | 0.0307 |
| 0.190 | 4.935 | 99.9997 | 0.0005145 | | | 0.11341 | | |
| | | | | 0.185 | 0.001278 | | 0.01162 | 0.1100 |
| 0.180 | 4.675 | 99.9982 | 0.0017925 | | | 0.10179 | | |
| ... | ... | ... | ... | 0.175 | 0.004045 | | 0.011 | 0.3677 |
| 0.170 | 4.416 | 99.9942 | 0.005837 | | | 0.09079 | | |
| | | | | 0.165 | 0.01193 | | 0.01037 | 1.1509 |
| 0.160 | 4.156 | 99.982 | 0.01777 | | | 0.08042 | | |
| | | | | 0.155 | 0.03279 | | 0.00973 | 3.360 |
| 0.150 | 3.896 | 99.95 | 0.05056 | | | 0.07069 | | |
| 0.144 | 3.740 | 99.91 | 0.092 | 0.145 | 0.08391 | | 0.00911 | 9.211 |
| 0.140 | 3.636 | 99.87 | 0.13447 | | | 0.06158 | | |
| | | | | 0.135 | 0.19986 | | 0.00849 | 23.55 |
| 0.130 | 3.377 | 99.67 | 0.33433 | | | 0.05309 | | |
| | | | | 0.125 | 0.44267 | | 0.00785 | 53.39 |
| 0.120 | 3.117 | 99.22 | 0.7770 | | | 0.04524 | | |
| | | | | 0.115 | 0.911 | | 0.00723 | 126.00 |
| 0.110 | 2.857 | 98.31 | 1.688 | | | 0.03801 | | |
| | | | | 0.105 | 1.74 | | 0.00659 | 264.04 |
| 0.100 | 2.597 | 96.57 | 3.428 | | | 0.03142 | | |
| | | | | 0.095 | 3.08 | | 0.00597 | 515.91 |
| 0.090 | 2.338 | 93.49 | 6.507 | | | 0.02545 | | |
| 0.089 | 2.306 | 93.00% | 7.00% | 0.085 | 5.038 | | 0.00534 | 942.77 |
| 0.087 | 2.260 | 92.22% | 7.78% | | | 0.02378 | | |

TABLE 2-continued

| r, mm | d/ω₀, 2r/0.077 | $P_F$, % | $P_{TL}$, % | $r_m$, median radius | $\Delta P_{TL}$, % in circle with width 10 μm | $\pi r^2$ circle area (mm²) | A, _ring area, (mm²) | %/A, (%/mm²) |
|---|---|---|---|---|---|---|---|---|
| 0.080 | 2.078 | 88.45 | 11.55 | | | 0.02011 | | |
| | | | | 0.0785 | 5.91 1.984 | | 0.005179 0.00151 | 1141.1 1,314.6 |
| 0.077 | 2.000 r = ω₀ | 86.47 | 13.53 | | Checking Σ = 13.528 | 0.0186 | | |
| | | | | 0.0755 | 2.238 | | 0.00143 | 1,565.0 |
| 0.074 | 1.922 | 84.23 | 15.77 | | | 0.0172 | | |
| | | | | 0.0725 | 2.49 | | 0.00136 | 1,830.9 |
| 0.071 | 1.844 | 81.74 | 18.26 | | | 0.01584 | | |
| | | | | 0.0695 | 2.758 | | 0.00131 | 2,105.3 |
| 0.068 | 1.766 | 78.98 | 21.02 | | | 0.01453 | | |
| | | | | 0.066 | 4.096 | | 0.00166 | 2464.4 |
| 0.064 | 1.662 | 74.88 | 25.12 | | | 0.01287 | | |
| | | | | 0.062 | 4.570 | | 0.00156 | 2,928.99 |
| 0.060 | 1.558 | 70.31 | 29.694 | | | 0.01131 | | |
| | | | | 0.058 | 5.026 | | 0.00146 | 3,447.27 |
| 0.056 | 1.455 | 65.28 | 34.72 | | | 0.00985 | | |
| | | | | 0.054 | 5.45 | | 0.001355 | 4,022.14 |
| 0.052 | 1.351 | 59.83 | 40.17 | | | 0.00849 | | |
| | | | | 0.050 | 5.8 | | 0.00125 | 4,640.00 |
| 0.048 | 1.247 | 54.13 | 45.97 | | | 0.00724 | | |
| | | | | 0.046 | 6.075 | | 0.001158 | 5,246.12 |
| 0.044 | 1.143 | 47.95 | 52.05 | | | 0.00608 | | |
| | | | | 0.042 | 6.24 | | 0.001053 | 5,925.93 |
| 0.040 | 1.039 | 41.71 | 58.29 | | | 0.005027 | | |
| | | | | 0.038 | 6.3 | | 0.000955 | 6,596.86 |
| 0.036 | 0.935 | 35.41 | 64.59 | | | 0.004072 | | |
| | | | | 0.034 | 6.20 | | 0.000855 | 7,251.38 |
| 0.032 | 0.831 | 29.21 | 70.79 | | | 0.003217 | | |
| | | | | 0.030 | 5.97 | | 0.000754 | 7,917.86 |
| 0.028 | 0.727 | 23.24 | 76.76 | | | 0.002463 | | |
| | | | | 0.026 | 5.58 | | 0.000653 | 8,545.18 |
| 0.024 | 0.623 | 17.66 | 82.34 | | | 0.001810 | | |
| | | | | 0.022 | 5.04 | | 0.000553 | 9,109.78 |
| 0.020 | 0.519 | 12.62 | 87.38 | | | 0.001257 | | |
| | | | | 0.018 | 4.35 | | 0.000453 | 9,602.65 |
| 0.016 | 0.416 | 8.27 | 91.73 | | | 0.000804 | | |
| | | | | 0.014 | 3.53 | | 0.000352 | 10,028.41 |
| 0.012 | 0.317 | 4.74 | 95.26 | | | 0.000452 | | |
| | | | | 0.010 | 2.6 | | 0.000251 | 10,358.57 |
| 0.008 | 0.209 | 2.14 | 97.86 | | | 0.000201 | | |
| | | | | 0.006 | 1.6 | | 0.000151 | 10,614.69 |
| 0.004 | 0.104 | 0.54 | 99.46 | | | 0.0000503 | | |
| | | | | 0.002 | 0.54 | | 0.0000503 | 10,735.59 |
| 0 | 0 | 0 | 100 | | | 0 | | |

Figure 3:
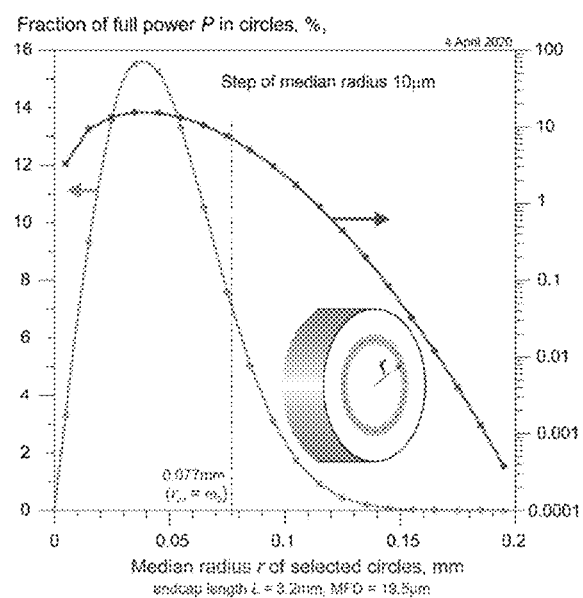
FIG. 3 depicts a graph of power density in circles with width 10 μm versus a circle radius on the facet of the collimator of FIG. 1.

FIG. 3 depicts a graph of power density in circles with width 10 μm versus a circle radius r on the facet of the collimator of FIG. 1. The power density in the center of the facet is 10,700% of P/mm², as such, for P=1 kW, the power density is about 107 kW/mm²=10.7 MW/cm². This is a high power density, but still 100 times less than optical damage threshold (which exceeds >1 GW/cm²).

Outside of the area with radius r facet=ω₀=0.077 mm, Gaussian beam has the truncated fraction $P_{TL}=1/e^2$ (0.1353) of maximum intensity of Gaussian beam (in center), and the corresponding radius r facet can be called as "Gaussian" radius $r_G$ or ω₀. On a circle with such radius, the power density is ~1,400% of P/mm², for P=1 kW it is equal 14 kW/mm². Near the outer edge o of the facet where $r_{facet}$=0.2 mm, the power density decreases to 0.0307% of P/mm² and for P=1 kW the power density is 0.3 W/mm², that is about 40,000 times less than near the inner edge i where near Gaussian radius $r_G$=ω₀=0.077 mm. The truncation of Gaussian beam with outer edge is extremely small, of the order of 0.0001% of full power P (~1 mW for P=1 kW).

The coreless endcap with dimensions $L_{cap}$=3.2×$D_{cap}$=0.4 mm has a weight of about 1 mg while be capable of transmitting 1.99 kW without danger heating of the fiber tip and facilitating the use of a fast movable endcap holding structure. The extrapolated power could be as high as 5 kW or more. Such high power may require the use of high precision fabrication techniques to produce endcap features (bevels, central area inclination and dimensions). Using as an example the foregoing endcap dimensions, the following describes a calculation of range of endcap parameters, e.g. bevel angle and dimension of central facet area, to provide the reliable re-directing the beam tails truncated with inclined bevel surfaces into the collimating lens. The suggested calculations support various sizes and shapes of endcaps with optimized fractions of beam with global maximum, facet truncated beam tails and fraction scattered with outer endcap edges. This optimization supports the simplification of precision fabrication of endcap facet features without overweighting the endcap mass which can reduce the frequency response of an adaptive fiber positioner.

In FIG. 1A-1D, the "cold" beam propagation coming from outer edge of bevel is shown as a dashed line and noted as "o". The solid lines show the propagation of central beam restricted with "Gaussian" divergence angle $\varphi = \alpha_G = 2\lambda/(\pi MFD) = 2 \times 1.07\ \mu m/(3.1456 \times 19.5\ \mu m) = 0.06986$ rad$=2.00°$. Outside of this angle, the truncated fraction is $1/e^2$ of full power (13.53%). The dashed lines show the propagation of beam tail ("cold" beam) re-directed with bevel surface close to outer edge "o" of bevel. Using the detail numerations of FIG. 1, the location $y_o$ of this beam tail on output lens is calculated from relation:

$$y_o = (F_f + x)\tan(\beta - \mu_o) + D_{cap}/2,$$

where, $$\mu_o = \sin^{-1}(1.45 \sin \kappa_o);$$

$$\kappa_o = \beta - \gamma;\ \gamma = \tan^{-1}(D_{cap}/2B);$$

$$B = L_{cap} - x;$$

$$x = (D_{cap}/2 - r_{flat}) @ \tan \beta$$

For Example: $r_{flat} = r_G = \omega_o = 0.077$ mm, F=350 mm, $D_{cap}=0.4$ mm, $D_{flat}=0.154$ mm, f=2.2 mm, $\alpha_{cap}=\tan^{-1}(r_{flat}/L_{cap})=1.38°$. $x=(D_{cap}/2-r_{flat}) @ \tan \beta=(0.2-0.077) @ \tan \beta=0.123 \tan \beta$.

The "hot" beam propagation coming from inner edge of bevel, noted as "i", shown as a dashed line and noted as "hot beam" in FIG. 1C. Using the detailed numerations in FIG. 1C, the location $y_i$ of this beam tail on output lens is calculated from relation:

$$y_i = F_f \tan(\mu_i - \beta) + r_{flat},$$

where, $\mu_i = \sin^{-1}(1.45 \sin \kappa_i), \varphi = \sin^{-1}(1.45 \sin \alpha_{cap})$, and $\kappa_i = \beta - \alpha_{cap}$ For selected dimensions of endcap, $L_{cap}, D_{cap}, r_{flat}$ the set of mentioned parameters: x, B, $\gamma$, $\kappa_o$, $\mu_o$, $\beta-\mu_o$, $y_o$, $\kappa_i$, $\mu_i$, $\mu_i-\beta$, $y_i$, were calculated in dependence on bevel angle $\beta$. The locations $y_o$ and $y_i$ of the truncated beams, coming from outer edge of bevel "o" and from inner edge of bevel "i", were presented in plots $y_o(\beta)$ and $y_i(\beta)$. In each plot the important data are presented as well, such as percentage of full power in global maximum, fraction of parasitic power truncated and scattered with outer cylinder edges of bevel, $P_{TLcy1}$, features of endcap facet, and the like.

Example calculations are presented below for various embodiments of the invention where $\beta$ is varied from 2 to 11 for a collimator having the following parameters:

$L_{cap} = 4$ mm, $D_{cap} = 0.4$ mm, $P_{TL} = 7\%$, $D_{flat}/\omega_0 = 2.306$, $\omega_o = (4/3.2) @ 0.077 = 0.096$ mm, $r_{flat} = (4/3.2) @ 0.089 = 0.111$ mm, $D_{flat} = 0.2225$ mm, bevel width 89 $\mu m$ $\alpha_{cap} = \tan^{-1}(r_{flat}/L_{cap}) = 1.59°$.

angle $\varphi$ of "edge beam" $y_{edge}$ with optical axis, see FIGs. 1A–C:

$\sin \varphi/\sin \alpha_{cap} = n(n = 1.45);\ \varphi = \sin^{-1}(1.45 \sin \alpha_{cap});$ $\varphi = \sin^{-1}(1.45 \sin 1.59°) = 2.306°.$ $y_{edge} = F \tan \varphi = 350 \tan \varphi = 14.094$ mm
(within output lens with Dia = 30 mm).

$f$ = distance from facet to focus inside of endcap ( = image of core):

$\tan \varphi = r_{flat}/f;\ f = r_{flat}/\tan \varphi = 0.111/0.0403 = 2.75$ mm $F_{f(facet)} = F - f = (350 - 2.75) = 347.25$ mm $x = (D/2 - r_{flat}) @ \tan \beta = (0.2 - 0.111) @ \tan \beta = 0.089 \tan \beta$ $B = L_{cap} - x = 4 - x$ $\gamma = \tan^{-1}(0.2/B)$ $\kappa_o = \beta - \gamma$ $\mu_0 = \sin^{-1}(n \sin \kappa_o)$ $y_o = (F_f + x) \tan (\beta - \mu_o) + 0.2$ $\kappa_i = \beta - \alpha_{cap} = \beta - 1.59°.$ $\mu_i = \sin^{-1}(1.45 \sin \kappa_i)$ $y_i = \tan (\mu_i - \beta) F_f + / - 0.111$ Table 3 summarizes the various computed parameters as $\beta$ is varied from 2 to 11 for an endcap with the following dimensions: $L_{cap}=4$ mm, $D_{cap}=0.4$ mm, $P_{TL}=7\%$, $r_{flat}=0.111$ mm.

TABLE 3

| β | x, mm | B, mm | γ, deg | $\kappa_o$, deg | $\mu_o$, deg | $\beta - \mu_o$ | $y_o$ – cold mm | $\kappa_i$, deg | $\mu_i$, deg | $\mu_i - \beta$ | $y_i$ – hot mm |
|---|---|---|---|---|---|---|---|---|---|---|---|
| 2 | 0.0031 | 3.997 | 2.865 | −0.864 | −1.254 | 3.254 | 19.941 | 0.41 | 0.595 | 1.405 | +8.631 |
| 3 | 0.0047 | 3.995 | 2.8657 | 0.1343 | 0.1947 | 2.805 | 17.214 | 1.41 | 2.045 | 0.955 | +5.901 |
| 4 | 0.0062 | 3.9938 | 2.8669 | 1.1331 | 1.643 | 2.357 | 14.492 | 2.41 | 3.496 | 0.504 | +3.168 |
| 5 | 0.0078 | 3.9922 | 2.8680 | 2.1320 | 3.0922 | 1.908 | 11.767 | 3.41 | 4.948 | 0.052 | +0.428 |
| 6 | 0.0094 | 3.9906 | 2.8691 | 3.1309 | 4.5423 | 1.458 | 9.037 | 4.41 | 6.4015 | −0.4015 | −2.322 |
| 7 | 0.0109 | 3.9891 | 2.8702 | 4.1298 | 5.9939 | 1.0061 | 6.298 | 5.41 | 7.857 | −0.8574 | −5.086 |
| 8 | 0.0125 | 3.9875 | 2.8714 | 5.1286 | 7.4475 | 0.5525 | 3.548 | 6.41 | 9.316 | −1.3161 | −7.867 |
| 9 | 0.0141 | 3.9859 | 2.8725 | 6.1275 | 8.9037 | 0.0963 | 0.784 | 7.41 | 10.778 | −1.778 | −10.668 |
| 10 | 0.0157 | 3.9843 | 2.8737 | 7.1263 | 10.363 | −0.3630 | −2.000 | 8.41 | 12.244 | −2.244 | −13.494 |
| 11 | 0.0173 | 3.9827 | 2.8748 | 8.1252 | 11.826 | −0.8259 | −4.806 | 9.41 | 13.714 | −2.714 | −16.346 |

Table 4 lists the parameters of a number of specific embodiments of the invention that are described in detail below.

TABLE 4

| # | $L_{cap}$, mm | $D_{cap}$, mm | $P_{TL\,flat}$, % | $\omega_o$, on facet, mm | $r_{flat}$, mm | $D_{flat}/\omega_o$ | $D_{cap}/\omega_o$ | $P_{TLcylin}$, % | $P_{TLcylin}$, P = 1 kW | $\beta$, deg |
|---|---|---|---|---|---|---|---|---|---|---|
| 1 | 3.2 | 0.4 | 13.53 | 0.077 | 0.077 | 2 | 5.195 | 0.00014 | 1.4 mW | |
| 2 | 3.2 | 0.4 | 7.0 | 0.077 | 0.089 | 2.306 | 5.195 | 0.00014 | 1.4 mW | |
| 3 | 4 | 0.4 | 7.0 | 0.096 | 0.111 | 2.306 | 4.167 | 0.017 | 0.17 W | |
| 4 | 4.4 | 0.4 | 7.0 | 0.106 | 0.122 | 2.306 | 3.778 | 0.0795 | 0.8 W | |
| 5 | 5 | 0.4 | 7.0 | 0.120 | 0.139 | 2.306 | 3.325 | 0.398 | ~4 W | |
| 6 | 5 | 0.5 | 7.0 | 0.120 | 0.139 | 2.306 | 4.167 | 0.017 | 0.17 W | |
| 7 | 5 | 0.6 | 7.0 | 0.120 | 0.139 | 2.306 | 5 | 0.00373 | 0.037 W | |
| 8 | 6 | 0.6 | 7.0 | 0.144 | 0.1665 | 2.306 | 4.167 | 0.017 | 0.17 W | |
| 9 | | | | | Hex | | | | | |
| 10 | | | | | Semi-hex | | | | | |
| 11 | 6 | 0.6 | 7.0 | | Inclined facet | | | | | 5.5-9 |

Figure 4:
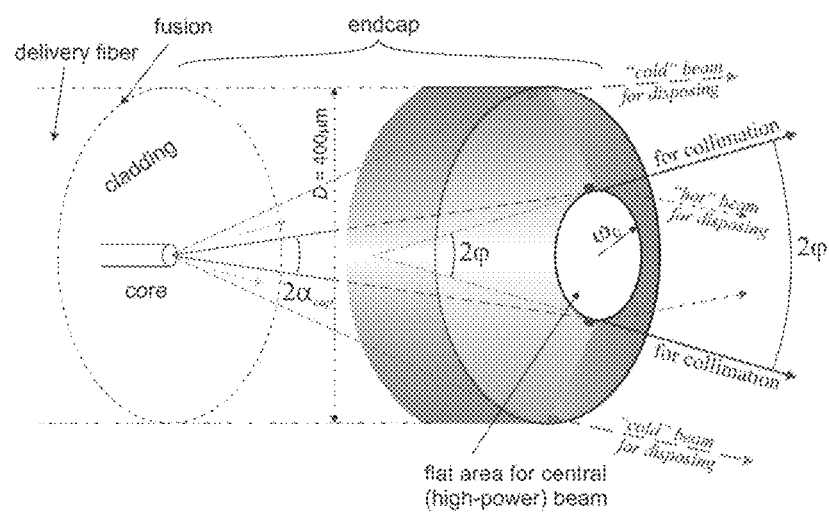
FIG. 4 depicts a portion (i.e., fiber and endcap) of the collimator of FIG. 1 in accordance with a first exemplary embodiment, when the flat area of facet truncates the Gaussian beam on level $1/e^2$ of peak power.

FIG. 4 depicts a portion (i.e., fiber and endcap) of the collimator 100 in accordance with a first exemplary embodiment, where the distal end of the fiber is fused to proximal end of coreless endcap having the same diameter as the fiber (e.g., 400 µm) and having a length L=3.2 mm. Mode field diameter MFD is 19.5 µm. The Gaussian angle $\alpha_G = \tan^{-1}[2\lambda/\pi(MFD)n] = \tan^{-1}[2\times1.07\ \mu m/(3.1459\times19.5\ \mu m\times 1,45)] = 1.38°$. $<\varphi=2.00°$–Gaussian angle in air. On the distal end of the endcap, a cone-shaped bevel is fabricated, where the flat central area has a diameter of about 0.154 mm and transmits the Gaussian fraction 86.5% of intensity (above level $1/e^2$). The periphery areas of the Gaussian beam carrying 13.5% of full power P are redirected to the output lens after passing through the angled bevel of the facet. More specifically, in an outer bevel circle, $D_{cap}/\omega_o=5.195$, $P_{TL}=0.000138\%$ of full power P. Power density=0.031% of full power P/mm², for P=1 kW, the power density is 0.3 W/mm², while power in the outer circle of the bevel with a circle width 10 µm is equal to 0.000376% of full power, or ~4 mW for P=1 kW. In the inner bevel circle, the power density=1,122% (of full power P)/mm², ~11,218 W/mm² for P=1 kW. Power in the inner circle of the bevel with a circle width 10 µm adjacent to the flat area is equal to 5.91% of full power P, ~59.1 W for P=1 kw).

In the embodiment of FIG. 4, the power density in areas near the inner edge of bevel adjacent to the flat area is about 40,000 times higher than near outer edges of the bevel adjacent to the outer cylindrical surface of the endcap. Thus, despite disposing of this radiation by re-directing into the output aperture, the area of the bevel adjacent to the flat area requires precision fabrication with good ARC (anti-reflection coating) to avoid parasitic radiation scattering.

FIGS. 5A and 5B depict the behavior of "cold" and "hot" beams plotted in dependence on the bevel angle β. It is seen, that in range of bevel angles from 6.2° to 9.8° both beams hit the output lens within the lens diameter, 30 mm. Thus, because of this wide range of useful bevel angels, there are no strict tolerance requirements for the bevel angle. In FIG. 5A, an example of deviation of "cold", $\beta-\mu_o$, and "hot", $\mu_i-\beta$, beams are also shown. The nominations of angles $\beta-\mu_o$, and $\mu_i-\beta$, and locations $y_o$ and $y_i$ of "cold" and "hot" beams on lens 106 are presented in FIG. 1B and FIG. 1C, respectively.

More specifically, FIG. 5A depicts deviations $\beta-\mu_o$ and $\mu_i-\beta$ of beams $y_o$ and $y_i$ from the optical axis and FIG. 5B depicts locations of beams $y_o$ and $y_i$ on the output lens. The main beam carrying 86.5% of full power is located in the center of lens in spot with radius $r_{lens}=12.22$ mm when using a Nufern fiber LMA 400/25, MFD=19.5 µm, endcap length 3.2 mm, diameter 400 µm, focal length of output lens F=350 mm, and a lens diameter of 30 mm.

To evaluate the propagation of the bevel truncated inner and outer beams after the beams have left the output lens, the detailed numerations of components are shown in FIG. 1D, and the location of imaginary sources of truncated beams, m and h, are calculated, where:

b—horizontal distance from the facet to an image of a source of the bevel truncated divergent beam, $h=(y_oK-y_i)/(K+1)$—vertical distance from the optical axis to an image of the source of the "bevel beam".

m=f-b—horizontal distance from an image of the emitting core to an image of the "bevel beam" source.

$$b=E/G-F_f, E=y_i+y_o, G=\tan(\mu_i-b)+\tan(\beta-\mu_0),$$
$$K=\tan(\mu_i-\beta)/\tan(\beta-\mu_0).$$

From Table 5, it is seen that an imaginary source is close to a fusing plane 112 of FIG. 1A and located in between the optical axis and the cylindrical surface of the endcap, which is consistent with FIG. 1D.

TABLE 5

| β | b | H | m = f − b | $y_o$ | $y_i$ |
|---|---|---|---|---|---|
| 4 | 2.218 | 0.0618 | −0.018 | 20.864 | 1.291 |
| 5 | 2.138 | 0.088 | 0.062 | 18.142 | −1.459 |
| 6 | 2.199 | 0.104 | 0.001 | 15.422 | −4.215 |
| 7 | 2.173 | 0.124 | 0.027 | 12.692 | −6.990 |
| 8 | 2.235 | 0.140 | −0.135 | 9.958 | −9.778 |
| 9 | 2.227 | 0.156 | −0.027 | 7.206 | −12.585 |
| 10 | 2.191 | 0.174 | 0.009 | 4.444 | −15.425 |
| 11 | 2.147 | 0.191 | 0.052 | 1.663 | −18.290 |

For estimation of behavior of parasitic beams disposed outside of the collimator, the bevel angle β=8°, which is convenient for fabrication, is used in calculations below.

At angle β=8°, the outer ("cold") beam is deviated to an upper area of the output lens, $y_0=+9.958$ mm, whereas the inner ("hot") beam is deviated into the bottom area of the output lens, $y_i=-9.778$ mm. At truncation on Gaussian level $e^{-2}$, the radius of Gaussian facet is $\omega_o=0.077$ mm.

The deviation $\rho_i-\beta$ of the "hot" beam is:

$$\sin(\mu_i)/\sin(\kappa_i)=n=1.45 \text{(fused silica)};\ \sin(\mu_i)=n\sin(\kappa_i)$$

$$\mu_i=\arcsin[n\sin(\kappa_i)]=\sin^{-1}[n\sin(\kappa_i)]=\sin^{-1}[1.45\sin(\kappa_i)]=\sin^{-1}[1.45\sin(\beta-\alpha_{cap})]=\sin^{-1}[1.45\sin(8°-1.38°)]=\sin^{-1}[1.45\sin 6.62°]=\sin^{-1}[1.45\times 0.1153]=\sin^{-1}[0.1672]=9.623°.$$

As such, the beam will be deviated to the bottom and the final direction is $\mu_i-\beta=9.623°-8°=1.623°$.

The location of a point $B_o$(hot), see FIG. 1D, where the "hot" beam crosses the optical axis is:

$$\omega_o/B_o=tg(\mu_i-\beta), B_o=\omega_o/tg(\mu_i-\beta)=0.077\ \text{mm}/tg(1.623°)=0.077\ \text{mm}/0.0283=2.718\ \text{mm}.\ B_o \text{ is shifted from focus on } b_o=f+\omega_o/\tan(\mu_i-\beta)=2.2\ \text{mm}+2.718=4.918\ \text{mm}.$$

The location $A_{hot}$ of the focus of the disposed "hot" beam (distance from the lens, FIG. 6) is:

$$1/F=1/(F-f)+1/A_{hot},$$

$$1/A_{hot}=1/F-1/(F-f)=(F-(F-f)/F(F-f)=f/[F(F-f)]$$

$$A_{hot}=[(F-f)F]/f=347.8\times 350/2.2=347.9\times 350/2.2=55,332\ \text{mm}=55.33m$$

The "hot" circle diameter $\Phi_{hot}$ at distance 55.33 m is:

$$\Phi_{hot}=[55.33m/0.3478m]2\omega_o=159.086\times 2\times 0.077\ \text{mm}=24.50\ \text{mm}=2.45\ \text{cm};$$

The divergence $\alpha_{hot}$ of the cone to the image of the hot circle is:

$$\alpha_{hot}=\tan^{-1}[\omega_o/(F-f)]=\tan^{-1}(0.077\ \text{mm}/347.8\ \text{mm})=\tan^{-1}(2.21392\times 10^{-4})=0.01268°.$$

At distance 1 km, the radius of the "hot" circle is: $r_{hot}=\tan\alpha_{hot}\times 1000\ m=22.14\ \text{cm}$.

At distance 1 km, the circular spot diameter $\Phi_{hot}=44.28\ \text{cm}=0.44\ \text{m}$.

The location $A_{cold}$ of the "cold" beam (circle $\Phi_{cold}$) from the output lens is:

$$1/F=1/(F-f+x)+1/A_{cold},\ \text{for }\beta=8°: x=(r_{flat}-\omega_o)tg\beta=(0.2-0.077)0.1405=0.017\ \text{mm}$$

$$1/A_{cold}=1/F-1/(F-f+x)=[(F-f+x)-F]/F(F-f+x)=(f+x)/[F(F-f+x)]$$

$$A_{cold}=[(F-f+x)F]/(f-x)=(347.8+0.017)\times 350/2.183=347.817\times 350/2.183=55.765m$$

The "cold" circle diameter $\Phi_{cold}$ at distance 55.765 m is:

$$\Phi_{cold}=(55.765m/0.347817)2r=159.086\times 0.4\ \text{mm}=64.13\ \text{mm}=6.41\ \text{cm};$$

The divergence $\alpha_{cold}$ of the cone to the image of cold circle is:

$$\alpha_{cold}=\tan^{-1}[r/(F-f+x)]=\tan^{-1}(0.2\ \text{mm}/347.817\ \text{mm})=\tan^{-1}(5.75015\times 10^{-4})=0.03295°.$$

At distance 1 km, radius of the cold circle is: $r_{cold}=\tan\alpha_{cold}\times 1000\ m=57.5\ \text{cm}$ At distance 1 km, the circular "cold" spot diameter $\Phi_{cold}=115.0\ \text{cm}=1.15\ \text{m}$.

The bevel of facet will be imaged as cut cone with "hot" top directed to collimator, on distance 55.33 m and diameter 2.45 cm. The length of cone is 44 cm and "cold" bottom will be on distance 55.77 m and diameter 6.41 cm.

At a distance 1 km, the "hot" circle of radiation disposed from inner area of facet bevel has a diameter 44 cm.

Figure 7:
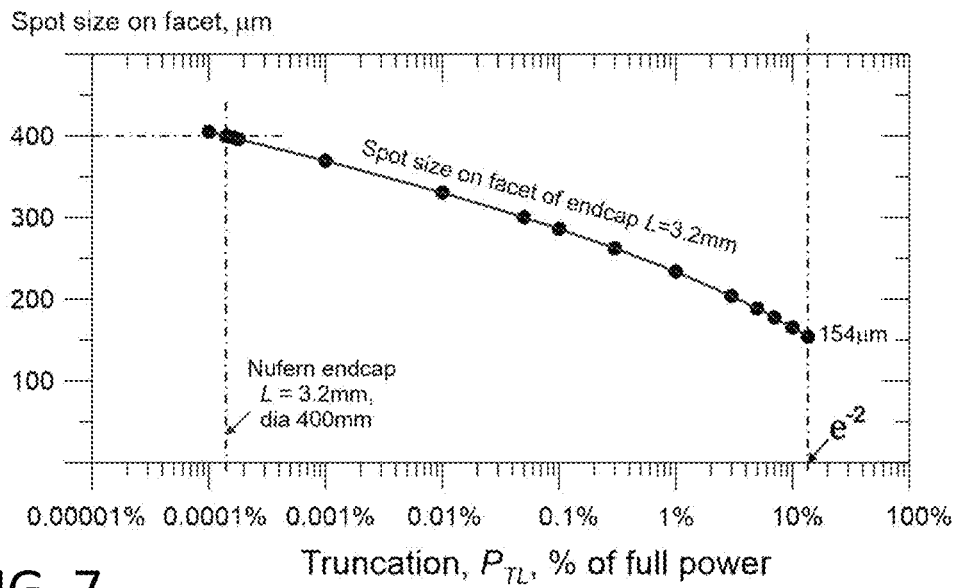
FIG. 7 depicts a graph of a diameter of a spot illuminated with a Gaussian beam on a facet of the endcap of the collimator of FIG. 1 in dependence on truncated fraction $P_{TL}$.

FIG. 7 depicts a graph of a diameter of a spot illuminated with a Gaussian beam on a facet of the endcap with length 3.2 mm in dependence on corresponding fraction ($P_{TL}$, % of full power P) outside of the spot. The truncated fraction $P_{TL}$ of full power P is shown in dependence on the diameter $D_{flat}$ of the flat area on the facet. From Table 1 and FIG. 7, it follows, that slightly larger diameter of flat area $D_{flat}=177.5-188.5$ μm allows transmission of 93-95% of the power to the output lens, and the truncated fraction decreases to 7% . . . 5%, respectively. It should be noted that non-beveled facet of the endcap with L=3.2 mm will obscure only about 1-1.4 millionth part of full power P with the facet edges (diameter 400 μm), see Table 1.

Using parameters of the endcap described for embodiment #1 in Table 4, the truncation of 13.53% may carry significant power to dispose from the output aperture (e.g., 135 W from P=1 kW, and 13.5 kW for an 100 kW collimator array). To reduce this amount of lost power to, for example, $P_{TL}$=7% (70 W from 1 kW or 7 kW from 100 kW, ~2 times smaller than for "Gaussian" truncation), the flat area diameter $D_{flat}$ on the facet should be increased, for example, from $D_{flat}/\omega_o$=2 (Gaussian, $P_{TL}$=13.5%) to $D_{flat}/\omega_o$=2.306, which gives the $P_{TL}$=7%.

Figure 8:
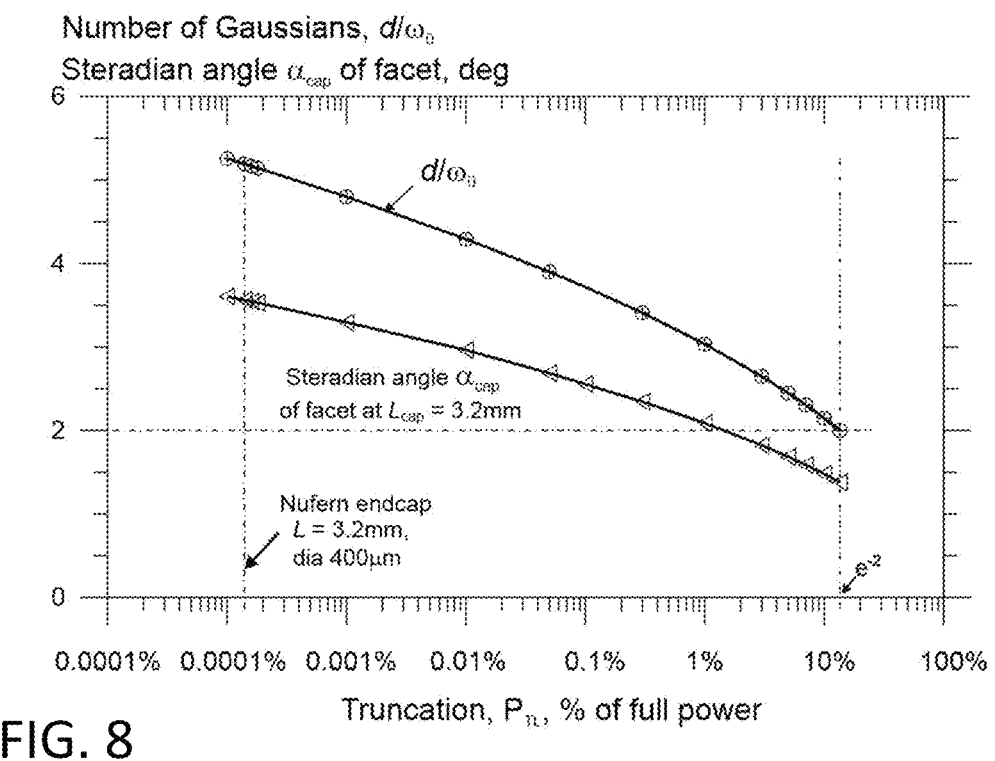
FIG. 8 depicts a graph showing a truncated fraction $P_{TL}$ of full power versus a size of a truncating aperture of the collimator of FIG. 1.

FIG. 8 depicts a graph showing a strong decrease of truncated fraction PT of full power for a small increase in size of the truncating aperture. The truncated fraction $P_{TL}$ is shown as dependent on truncating aperture $D_{flat}/\omega_o$ in units of Gaussian parameter $D_G/\omega_o$. Also depicted is steradian angle $\alpha_{cap}$ at which this aperture on the facet is visible. For instance, for an endcap with length L=3.2 mm and a core mode field diameter MFD=19.5 μm, the steradian angle $2\alpha_{cap}$ corresponding to truncation of $1/e^2\sim 0.135$ (13.5%) is equal to 2.76° with $D_{flat}/\omega_o$=2 ($\alpha_{cap}\sim 1.38°$).

In another embodiment (Embodiment 2 in Table 4), the flat central area of the facet has a diameter of 177 μm, which increases the transmitting aperture $D_{flat}/\omega_o$=2.306 and decreases truncation to $P_{TL}$=7% with an increase of transmission from the flat central area to 93% of full power P. In this embodiment, the power in the inner bevel circle with width 10 μm is 4.4 W, that is 15 times smaller than for the previous embodiment, with power 59.1 W in such circle (Embodiment 1 in Table 4). Thus, easing the requirements for bevel quality.

Figure 9:
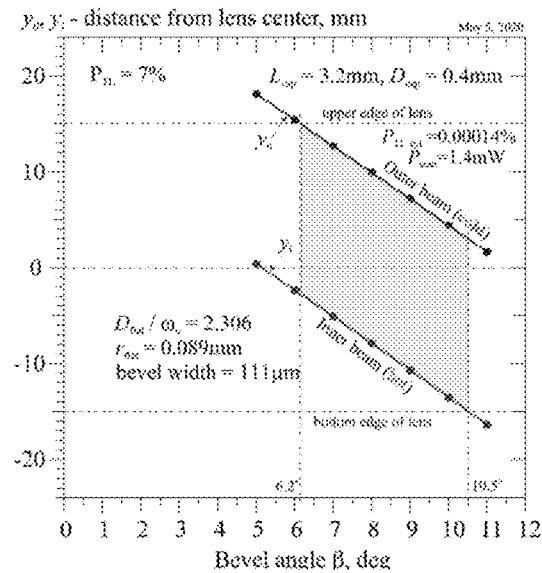
FIG. 9 depicts the behavior of the inner "hot" and outer "cold" beams of the beam tails transmitted from the angled bevel for Embodiment 2 of the collimator of FIG. 1.

FIG. 9 depicts the behavior of the inner "hot" and outer "cold" beams of the beam tails from the angled bevel for Embodiment 2 of Table 4, where the locations $y_0$ and $y_i$ of the "cold" and "hot" beams on the output lens are plotted in dependence on bevel angle $\beta$. It is seen, that in range of bevel angles from 6.2° to 10.5° both beams hit the output lens within its diameter of 30 mm. Again, there are no strict requirements to tolerance of bevel angle and a comfortable range of bevel angles may be used. Embodiment 2 has small increase in the bevel angle range over Embodiment 1, e.g., range extended to 10.5°. The main beam, carrying 93% of full power, is located in a spot on the lens center having a spot radius $r_{lens}$=14.16 mm, with a lens fill factor ~94% higher than in Embodiment 1 (e.g., ~82%).

The percentage of radiation that is truncated at the outer edges of the beveled endcap is dependent on the length of the endcap. This relationship may be expressed as follows:

$$P_{TL\ cyl}=\exp\{[(D_{cyl}/r_G)^2]/2\}; r_G=L_{cap}@\tan(\omega_o);$$

$$L_{cap}=D_{cyl}/\{\tan(\omega_o)@[2\ln(P_{TL\ cyl})]^{1/2}\}$$

EXAMPLES $P_{TLcyl} = 0.001(0.1\%)$, endcap facet diameter $D_{cyl} = 0.4$ mm,
   $L_{cap} = 4.47$ mm;

$P_{TLcyl} = 0.0001(0.01\%)$, endcap facet diameter $D_{cyl} = 0.4$ mm,
   $L_{cap} = 3.87$ mm; Table 1

Figure 15:
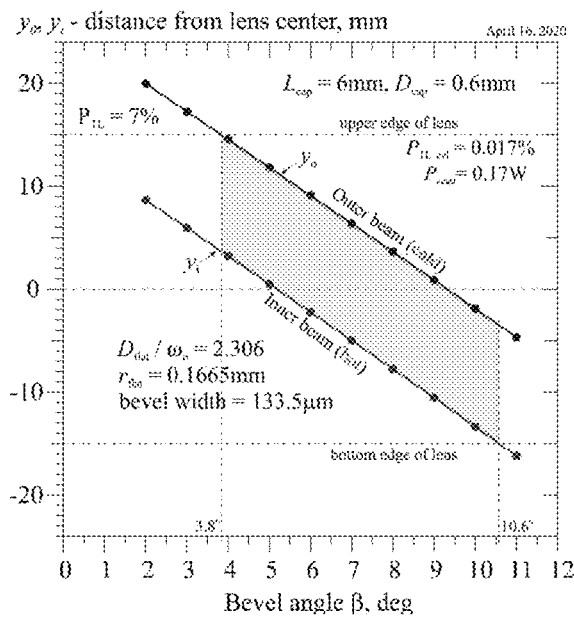
FIG. 15 depicts the locations $y_o$ and $y_i$ of the "cold" and "hot" beams on the output lens plotted in dependence on bevel angle β for Embodiment 8 of the collimator of FIG. 1.

$P_{TLcyl} = 0.00017(0.017\%)$, endcap facet diameter $D_{cyl} = 0.6$ mm,
   $L_{cap} = 5.98$ mm, Embodiment 8 describes this case ($L_{cap}=6$ mm, $D_{cap}=0.6$ mm), see FIG. 15.

The increase of length $L_{cap}$ of the endcap is favorable in managing the back reflected radiation from the facet. Anti-reflection coating, ARC, on a facet may have a reflection coefficient of 0.1%, which means that about 1 W (if P=1 kW) may impinge upon the emitting core when using rectangular cleaving of the facet. Such power directly reflected into the core may damage the low-power stages of fiber amplifiers that drive the fiber. In the fiber laser industry, a commonly used method is to incline the facet to deviate the peak of Gaussian reflected beam from the core into the cladding, described with reference to FIGS. 19 and 20 below. As is well known, the reflected radiation that is directed into the cladding may be intercepted and disposed using cladding mode strippers.

Cleaving or polishing of the endcap facet at an angle $\delta \sim 3.5°$ will protect low-power amplifier stages from back reflected radiation with an endcap of length $\sim 3.5$ mm. Such an angle is more than 2 times less than a conventional facet angle (e.g., 8°) used with non-endcapped fibers. In free-space transmitters, the angled facet leads to deviation of the Gaussian beam optical axes and the compensation of this deviation should be accomplished by deviating the fiber emitting tip in an opposite direction $\sigma = \sin^{-1}(n \sin \delta) - \delta$. For an endcap with $L_{cap}=3.2$ mm, this adjusting angle $\sigma$ is about 1.6°. An increase in endcap length $L_{cap}$ from 3.2 mm to 4-5 mm may result in a decrease of the facet cleaving angle to 2.5-2.7° with the useful reduction of the necessary adjustment angle to $\sigma=1.1° \ldots 1.2°$, see the description of Embodiments 11 and 12 below.

Figure 10:
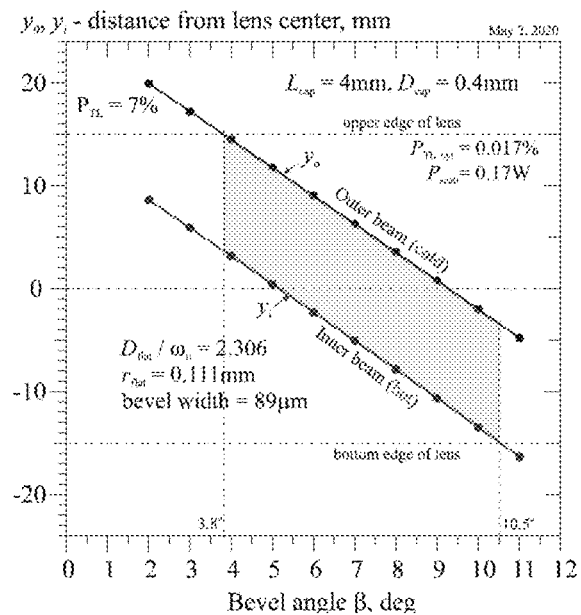
FIG. 10 depicts a graph of the locations of beams $y_o$ and $y_i$ on the lens in dependence on the bevel angle β for Embodiment 3 of the collimator of FIG. 1.

In another embodiment (Embodiment 3 in Table 4), the endcap length is extended to 4.0 mm. FIG. 10 depicts a graph of the locations of beams $y_o$ and $y_i$ on the lens in dependence on the bevel angle β. It is seen, that the useful range of bevel angles is 3.8° to 10.5° where both beams hit the output lens within the lens diameter of 30 mm. In view of such a wide range of useful bevel angles, the manufacturing tolerance requirements of the bevel angle becomes even less strict compared to the embodiments described above. Main beam, carrying 93% of full power is located in the spot on the lens center having a spot radius $r_{lens}=14.1$ mm, with high fill factor ~94%.

In Embodiment 4, the distal end of the fiber (e.g., LMA-400/25) is fused to proximal end of coreless endcap having an increased length $L_{cap}$ of 4.4 mm and a diameter 400 μm. On the distal end of endcap, the bevel is fabricated with flat central area $D_{flat}=0.245$ μm, providing the transmitting aperture $D_{flat}/\omega_o=2.306$ with the same truncation $P_{TL}=7\%$ as in Embodiments #2 and #3. Weight of endcap about 1.2 mg, $r_{flat}=0.122$ mm, $\omega_o=0.106$ mm (on facet). $D_{cap}/\omega_o=4.68$, $P_{TL\ cyl}$ (with outer cylinder surface Φ0.4 mm)=0.0795% (~0.8 W from 1 kW), $\alpha_{cap}=1.59°$, φ=2.31°, flat area transmits 93%. In the outer circle of the bevel, where $D_{cap}/\omega_o=4.68$, power density=0.031% of full power P/mm², (0.3 W/mm² for P=1 kW). Power in the outer circle with width 10 μm is 0.000376% of full power (4 mW for P=1 kW). In the inner bevel circle with width 10 μm, power is 0.44% of full power (~4.4 W at P=1 kW). The increase of endcap length will increase proportionally the diameter of spot on a facet with the same $P_{TL}=7\%$. The width of bevel will be narrower than in the previous embodiments (78 μm instead of 89 μm).

Figure 11:
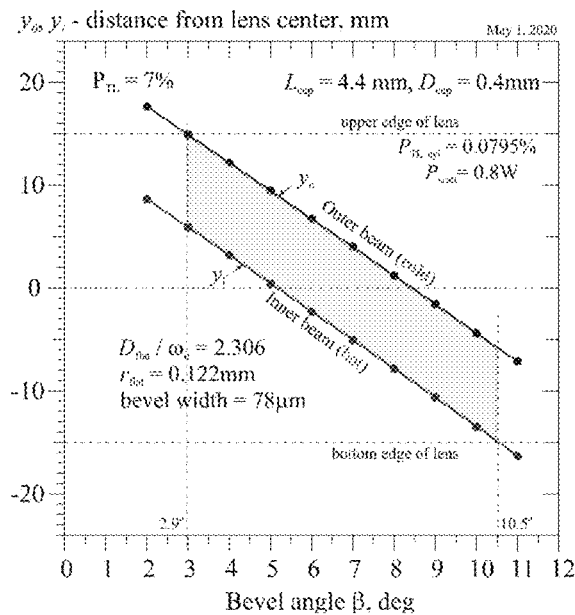
FIG. 11 depicts the location $y_o$ and $y_i$ of the "cold" and "hot" beams plotted in dependence on the bevel angle β for Embodiment 4 of the collimator of FIG. 1.

In FIG. 11, the location $y_o$ and $y_i$ of the "cold" and "hot" beams are plotted in dependence on the bevel angle β for Embodiment 4. The range of useful bevel angles is 2.9° to 10.5° where both beams hit the output lens within a lens diameter of 30 mm. In this case, the requirements to tolerance of bevel angle became even less strict than in previous embodiments. Main beam, carrying 93% of full power, is located in a spot on the center of the lens with a spot radius $r_{lens}=14.16$ mm, with high fill factor ~94%.

Note that the increase in length of only 10% increases the parasitic radiation truncated by the outer edges of the endcap facet by 4 times (0.017% for $L_{cap}=4$ mm to 0.081% for $L_{cap}=4.4$ mm), and almost 600 times larger than for endcap with $L_{cap}=3.2$ mm (0.00014%, See Table 4). For perspective power P=5 kW, the truncated fraction $P_{TL\ cyl}=4$ W may be too high and may lead to uncontrolled heating of inner elements of the collimator and/or, in case of LIDARs, to decrease the performance of sensing the atmospheric returned photons.

In Embodiment 5, the distal end of fiber is fused to proximal end of coreless endcap with a diameter of 400 μm (same diameter as in Embodiments 1 through 4) and with further increase of length $L_{cap}=5$ mm. On the distal end of endcap, the bevel is fabricated with flat central area $D_{flat}=0.278$ μm, providing a transmitting aperture $D_{flat}/\omega_o=2.306$ with the same truncation $P_{TL}=7\%$ as in Embodiments 2 through 4. Weight of the endcap is about 1.4 mg.

Figure 12:
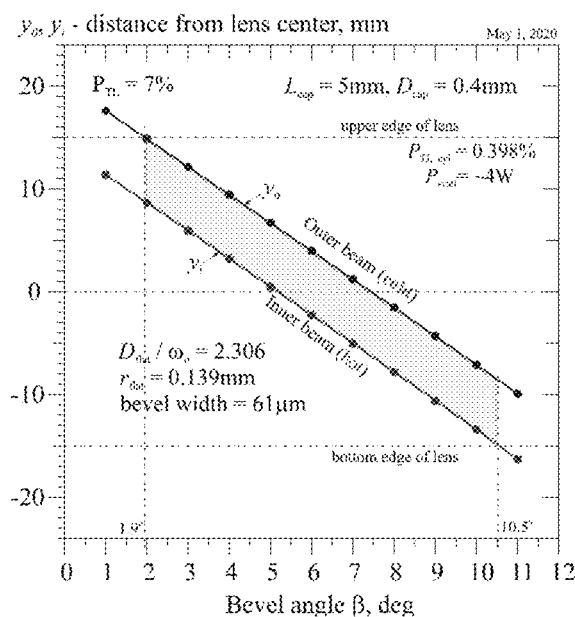
FIG. 12 depicts the locations $y_o$, $y_i$ of the "cold" and "hot" beams plotted in dependence on bevel angle β for Embodiment 5 of the collimator of FIG. 1.

In FIG. 12, the locations $y_o$, $y_i$ of the "cold" and "hot" beams are plotted in dependence on bevel angle β. The useful range of bevel angles is shown to be 1.9° to 10.5° where both beams hit the output lens within lens diameter of 30 mm, and manufacturing tolerance requirements for the bevel angle became much less strict than in previous Embodiments. However, the outer edges of endcap truncate $P_{TL\ cyl}=0.398\%$ which results in a higher level of power at the edges.

In Embodiment 5, the main beam, carrying 93% of full power, is located in center of lens in spot with radius $r_{lens}=14.16$ mm. The parameters of collimator are selected the same as in Embodiments #1-#4. $P_{TLcylin}$ (with outer cylinder surface (Φ0.4 mm)=0.398% (~4 W from 1 kW). The high level of energy truncation may be problematic for a viable collimator. For instance, at perspective power of 5 kW, the scattered power could be as much as 20 W. Thus, at such length $L_{cap}$, the endcap diameter $D_{cap}$ should be increased. Further embodiments are described below having an increased endcap diameter $D_{cap}$.

In Embodiment 6, the diameter of the endcap is increased while maintaining the length of the endcap as in Embodiment 5. Specifically, Embodiment 6 has an increased endcap diameter, $D_{cap}=0.5$ mm, length $L_{cap}=5$ mm, weight 2.2 mg. $D_{flat}/\omega_o=2.306$, $P_{TL}=7.0\%$. $D_{flat}=0.278$ mm, bevel width 0.111 mm (0.06 mm wider than at $D_{cap}=0.4$ mm). $r_{flat}=0.139$ mm. $\omega_0=0.120$ mm (on facet).

Figure 13:
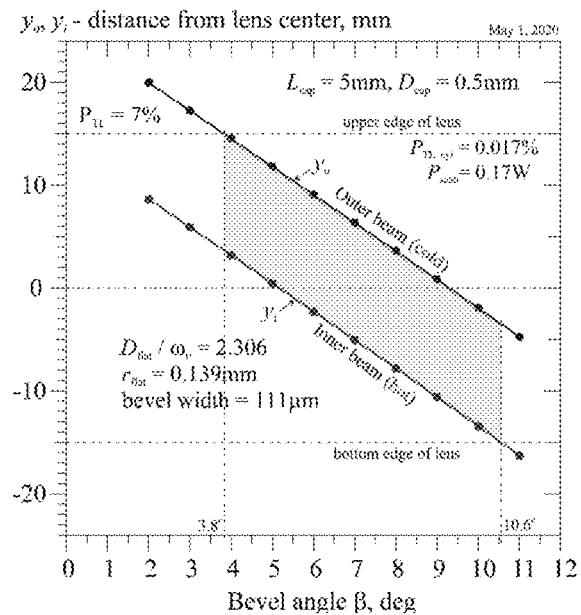
FIG. 13 depicts the location of $y_o$, $y_i$ of the "cold" and "hot" beams plotted in dependence on bevel angle β for Embodiment 6 of the collimator of FIG. 1.

In FIG. 13, for Embodiment 6, the location of $y_o$, $y_i$ of the "cold" and "hot" beams are plotted in dependence on bevel angle β. It is seen that the useful range of bevel angles is from 3.8° to 10.5° where both beams hit the output lens within lens diameter of 30 mm. As such, the tolerance requirements for the bevel angle β is not strict. The side cylinder surfaces of the endcap truncate a very small fraction of Gaussian beam $P_{TLcylin}$=0.017%, which is only 170 mW from a 1 kW beam. For power level of 5 kW, it is still small, at less than 1 W.

Figure 14:
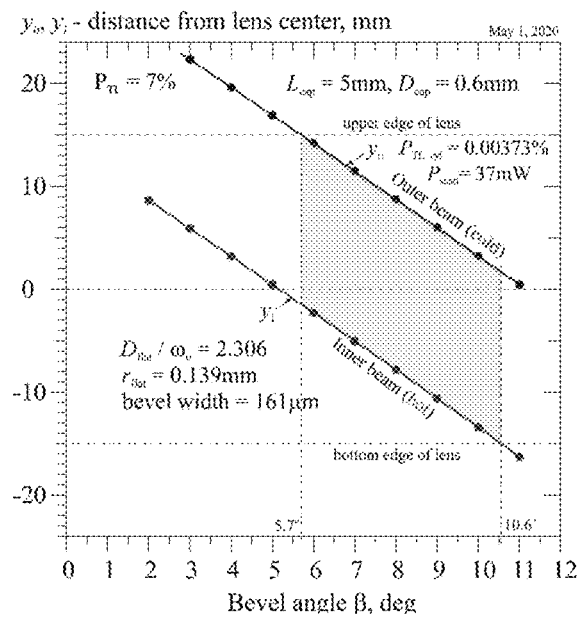
FIG. 14 depicts the locations $y_o$ and $y_i$ of the "cold" and "hot" beams on the output lens plotted in dependence on bevel angle β for Embodiment 7 of the collimator of FIG. 1.

In Embodiment 7, the diameter of the endcap is further increased to an endcap diameter of $D_{cap}$=0.6 mm. As for other parameters of Embodiment 7, the endcap length $L_{cap}$=5 mm, its weight is 3.1 mg, $D_{flat}$=2$r_{flat}$=5/3.2×2×0.089=0.278 mm, bevel width 0.161 mm. $r_{flat}$=0.139 mm. $\omega_0$=0.120 mm (on facet). In FIG. 14, for Embodiment 7, the locations $y_o$ and $y_i$ of the "cold" and "hot" beams on the output lens are plotted in dependence on bevel angle β. It is seen that the useful range of bevel angles is from 5.7° to 10.6° where both beams hit the output lens within lens diameter of 30 mm. As such, the tolerance requirements for the bevel angle β is not strict. The side cylinder surfaces of endcap truncate a very small fraction of Gaussian beam $P_{TLcyl}$=0.00373% that is only 37 mW from a 1 kW beam. For a power level of 5 kW, it is less than 0.2 W.

Note that as endcap diameter is increased in FIGS. 12-14, there is a significant decrease of parasitic power $P_{TLcyl}$ scattered by the outer cylinder surface (bevel) of the endcap.

In Embodiment 8, the endcap length is further increased to $L_{cap}$=6 mm with an endcap diameter $D_{cap}$=0.6 mm and an endcap weight of 3.7 mg. Other dimensions of the endcap of Embodiment 8 are: diameter of flat facet area 0.333 mm ($D_{flat}$=2$r_{flat}$=6/3.2×2×0.089=0.334, bevel width ~0.134 mm, $\omega_o$=0.144 mm (on facet), $D_{flat}/\omega_0$=2.306, $P_{TL}$~7%, $r_{flat}$=0.1665 mm, $r_{lens}$=14.17 mm (main beam edges on lens), and $D_{cap}/\omega_0$=4.167. The truncated power with an outer cylinder surface Φ0.6 mm is $P_{TLcyl}$=0.0170% (~170 mW from 1 kW), which is very acceptable for use with a high-power fiber.

FIG. 15 depicts, for Embodiment 8, the locations $y_o$ of the outer "cold" and $y_i$ of the inner "hot" beams on the output lens. Significant advantages arise for an endcap with increased size, $L_{cap}$=6 mm and $D_{cap}$=0.6 mm, which include, but are not limited to:

1) Large interval of bevel angles, from 3.8° to 10.6° degrees, and 2 times larger dimensions than an endcap with $L_{cap}$=3.2 mm allows for less precise bevel fabrication requirements.
2) Power density on a facet is almost 4 times smaller than for length $L_{cap}$=3.2 mm.
3) Smaller truncation with edges of endcap's outer cylinder surface, $P_{Tcylin}$=0.0178% of full power P. At P=1 kW, it is less than 200 mW (0.178 W). For multi-kW delivery fibers up to 5 kW, this fraction is still small, <1 W.
4) Contribution of diffraction from flat area $D_{flat}$=0.333 mm of facet is significantly less than for flat area $D_{flat}$=0.178 mm of the endcap with dimensions 3.2 mm×0.4 mm.

Figure 16:
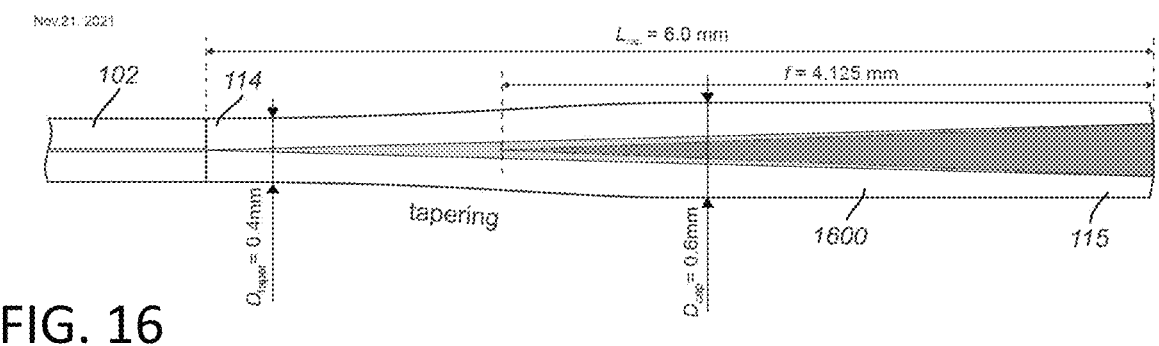
FIG. 16 depicts a schematic view of a beveled endcap having a tapered side profile in accordance with one or more embodiments of the present invention.
Figure 19:
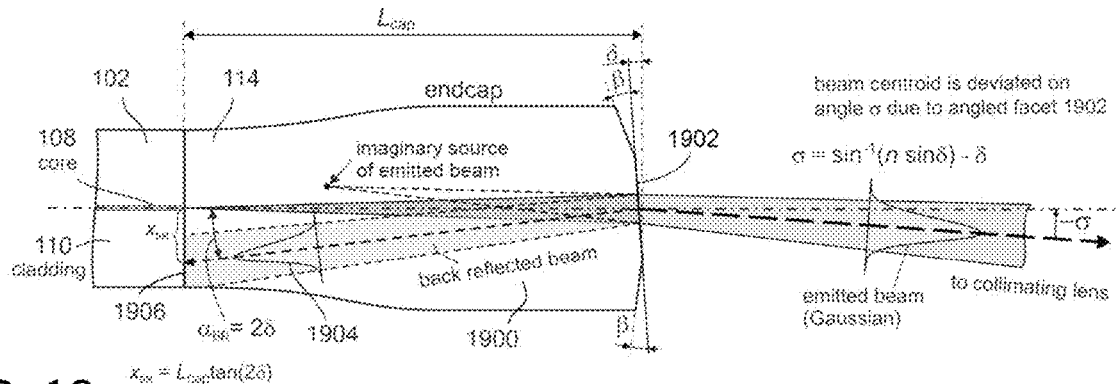
FIG. 19 graphically depicts a schematic view of a collimator having an inclined flat face of the facet in accordance with one or more embodiments of the present invention.

The weight of the endcap is important for systems that mechanically modulates the distal end of the fiber and endcap. As such, the endcap weight should be minimized. When using the larger beveled endcap of the embodiments described above, the weight of endcap may be reduced to compensate for the larger size and mass of the endcap by tapering the proximal end (the first end 114) of endcap to a diameter of the fiber cladding. Consequently, the endcap diameter (smaller diameter at the first end 114) matches the distal end 112 of the delivery fiber. Such an endcap 1600 is shown in FIG. 16. By using such tapering, the endcap weight could be reduced to ~3 mg. In general, it is not so important to reduce the weight of endcap because known fiber positioners can move a fiber holding structure with weight of tens of mg at a frequency range 5 kHz or more. An important advantage of a tapered endcap 1600 is that, when using an inclined facet 1902, the back reflected beam 1904 is reliably guided into the cladding 1906, as it is illustrated in FIG. 19.

Figure 17:
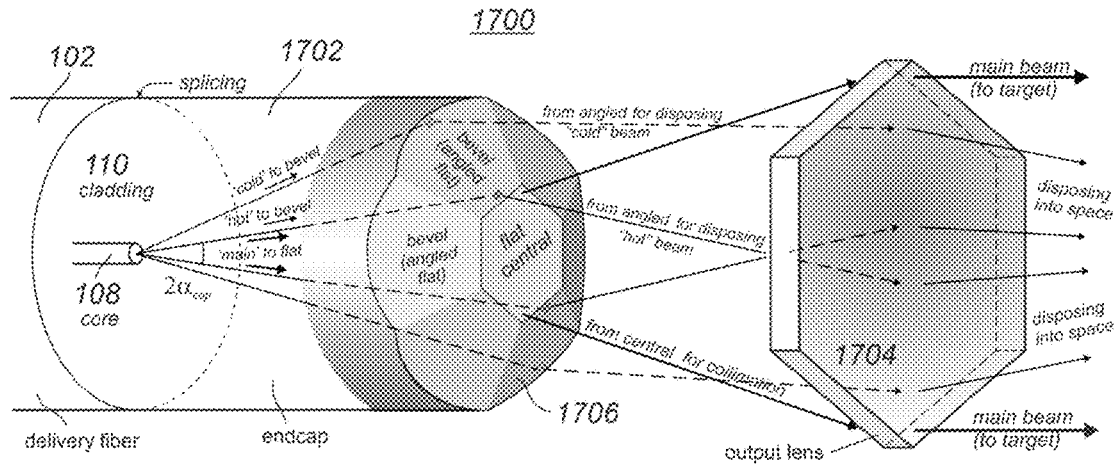
FIG. 17 depicts a schematic view of a collimator with hexagonal output lens in accordance with one or more embodiments of the present invention.
Figure 18:
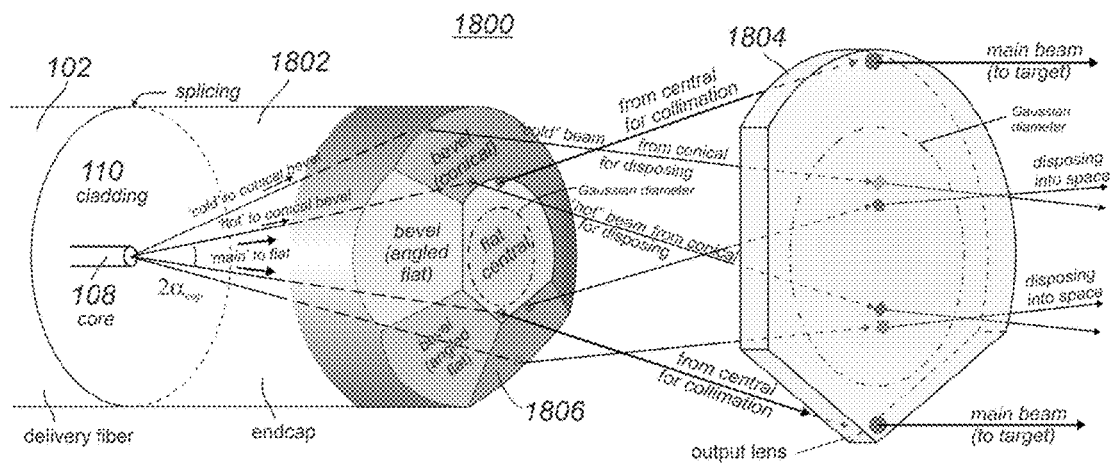
FIG. 18 depicts a schematic view of a collimator with semi-hexagonal output lens in accordance with one or more embodiments of the present invention.

In Embodiments 9 and 10 of FIGS. 17 and 18, the output lens of the collimator has a hexagonal form 1704, i.e., a "hexagonal" collimator 1700 of FIG. 17, and a semi-hexagonal form 1604, i.e., a "semi-hexagonal" collimator 1800 of FIG. 18. A hexagonal/semi-hexagonal collimators find use in a multi-lens array optical transmitter where each collimator handles a portion of the transmitted light beam. The cumulative beam generated from a plurality of hexagonal/semi-hexagonal collimators may have extremely high power, e.g., tens to hundreds of kilowatts. The hexagonal shape enables a large number of hexagonal collimators to be adjacently arranged into a closely packed array.

To facilitate a hexagonal collimator having the advantages described above with respect to Embodiments 1 through 8, the hexagonal and semi-hexagonal collimators comprise a delivery fiber 102, a beveled endcap 1702/1802 and a hexagonal or semi-hexagonal lens 1704/1804. The beveled endcap 1702/1802 has bevels 1706/1806 arranged in a hexagonal or semi-hexagonal pattern of flat bevels 1706/1806 to match the hexagonal or semi-hexagonal shape of the lens 1704/1804.

Figure 21:
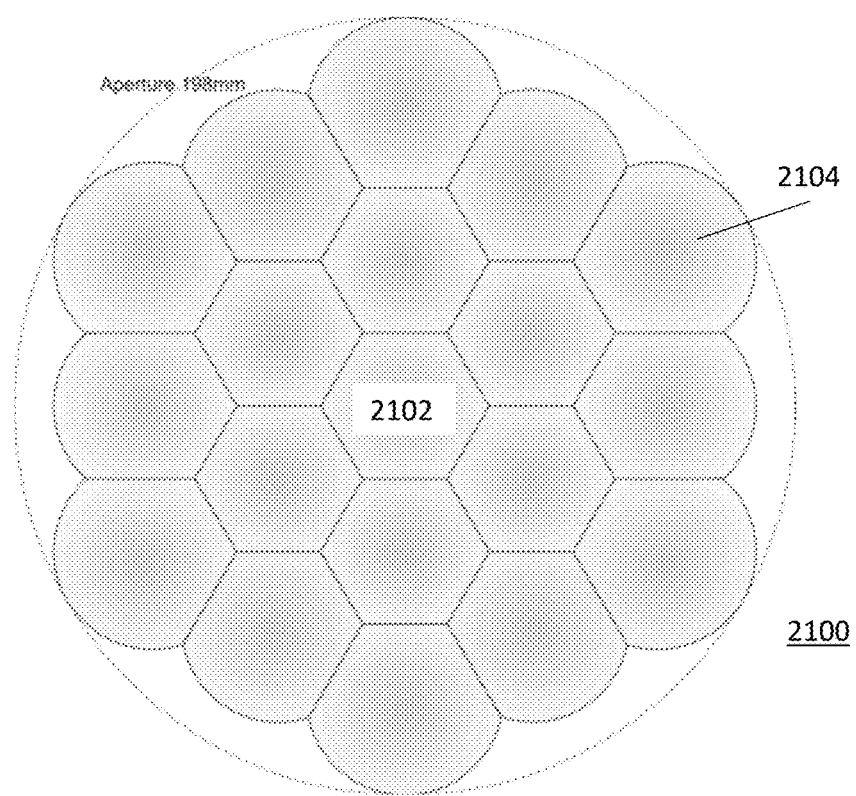
FIG. 21 depicts a front plan view of an exemplary optical transmitter.

In an exemplary optical transmitter, as shown in FIG. 21, an array 2100 may be formed of a central area of hexagonal collimators 2102 and an outer periphery of semi-hexagonal collimators 2104 such that the outer perimeter of the collimator assembly is somewhat circular. Such an arrangement forms an optimally compact collimator assembly. In one specific example, an array 2100 may be formed of 19-collimators comprising seven hexagonal central lenses of the hexagonal collimators 2102 and 12 "semi-hex" lenses of the semi-hexagonal collimators 2104 in the outer ring of the assembly. Through use of beveled endcaps described above, such an array transmits substantially all of the power (e.g., throughput of 99.9%) supplied by the delivery fibers with an insignificant amount of scattered radiation. Consequently, since very little power is truncated within the endcaps, such a collimator array may be fabricated without the need for a cooling system.

More specifically, each semi-hexagonal collimator has a $P_{TL}$ of about 3% such that more than 97% of full power propagates as a collimated beam and is focused on a target. For a high power P=5 kW, only 150 W is not delivered to the target, but disposed along the main collimated beam, as shown in FIG. 6. For comparison, the non-delivered power to a target for the collimators with a circular lenses of Embodiments 2 through 8 is 350 W for P=5 kW, that is more than 2 times higher than for semi-hexagonal collimators. In a 19 channel array with projected full power close to 100 kW, each collimator may emit 5 kW. Extra summed power delivered to the target owing to semi-hexagonal lenses, can be as large as 4 kW, in comparison with hexagonal collimators or circular collimators.

Briefly described above was the use of an inclined central area of the endcap facet to direct reflected light into the cladding. FIG. 19 graphically depicts an endcap 1900 having an inclined facet 1902. At an angle δ of the facet 1902, the back reflected beam 1904 is deviated on a double angle, 2δ, and the central area 1906 of the Gaussian beam misses the emitting core 108 and will hit the cladding 110.

For a typical delivery fiber, e.g., LMA 25/400, the angle δ of inclination of the facet surface is about 3.5°, and $L_{cap}$=3-3.5 mm. The back reflected (br) beam propagates at angle 7° from optical axis and the peak of beam will hit the fusion plane (fp) at a safe distance from the core axis $x_{br}=L_{cap}$@ tan7°=6.4 mm@0.123=0.8 mm. It is 2 times more than core radius $r_{core}$=0.2 mm, and the major fraction of the back-reflected beam enters the cladding with a zig-zag path of back propagation to a cladding mode stripper.

With an increase of the endcap length $L_{cap}$, the deviation $X_{BR}$ increases and the power density in the back reflected beam decreases. An increase in the endcap length allows for a reduction in the facet inclination angle to δ=2.5-3°. The optical axis of the output beam emitted from inclined facet is deviated from optical axis of fiber on angle σ:

$$\sigma = \sin^{-1}(n \sin \delta) - \delta$$

Figure 20:
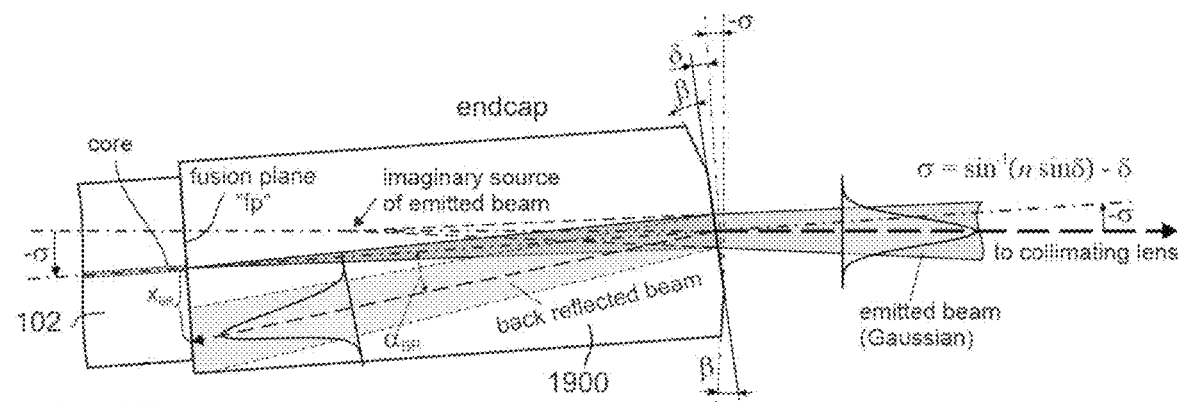
FIG. 20 graphically depicts a schematic view of a collimator having an inclined flat face of the facet and a compensating inclined fiber and endcap in accordance with one or more embodiments of the present invention.

As depicted in FIG. 20, to compensate for this output beam deviation, the delivery fiber 102 with endcap 1900 may be deviated in opposite direction on angle −σ. For an exemplary angle δ=3.5°, the compensating deviation angle σ=1.6°. At an increased length of endcap, the facet angle δ could be reduced. As such, the output beam deviation a also decreases, thereby decreasing the compensating deviation angle −σ. The decrease of angle σ simplifies the alignment of the collimators and ultimately supports the reliability and robustness of densely packed array of fiber collimators. Applying the calculations used above with respect to FIGS. 1A-D and summarized in Table 3 to the angled facet embodiment of FIGS. 19 and 20 showed that truncated beams $y_0$ and $y_i$ leaving the bevels still will hit the output lens with insignificant decrease of appropriate angle β of the bevel. For instance, FIGS. 22 and 23 depict Embodiment 11 where the beveled endcap is the same as described in Embodiment 8, $L_{cap}$=6 mm, $D_{cap}$=0.6 mm, but central area of facet is inclined an angle δ=3°. In comfortable range of bevel angle from β=5.5° to β=9°, the truncated beams hit the output lens in a circular spot. As shown in FIGS. 22A and 22B, for the smallest angle β=5.5°, the beam tails $y_0$ and $y_i$ hit the spot with diameter $\Phi_{disposed}$=18.745 mm, the spot is shifted to an upper part of the lens at a distance y=4.762 mm. As shown in FIGS. 23A and 23B, for the largest bevel angle β=9σ, the beam tails $y_0$ and $y_i$ hit the spot with diameter $\Phi_{disposed}$=19.01 mm, and the spot is shifted to the bottom part of the lens at a distance y=−4.87 mm.

While various embodiments have been described above, it should be understood that they have been presented by way of example only, and not limitation. For example, the diameter of delivery fiber can be different, e.g., cladding 125 μm or 250 μm. The divergence of Gaussian beam is also among variable parameters. The output lenses may vary in diameter, focal length, shaping, etc. depending on the desired size of the conformal aperture and the truncation of the beams delivered to the endcaps through the delivery fibers.

Any described delivery fiber with a beveled endcap described above can be embedded into a holding element of an adaptive structure. Such adaptive structures include a fiber positioner described in U.S. Pat. Nos. 8,503,837 and 9,632,254 which are hereby incorporated by reference herein in there entireties. Such adaptive structures may be embedded into a compact collimator as described in U.S. Pat. No. 9,223,091 which is hereby incorporated by reference herein in its entirety.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for controlling propagation of a light beam comprising:
    an optical fiber adapted for propagating a light beam toward a distal end; the optical fiber has only a single core;
    an endcap comprising a first end and a second end, where the first end is coupled to the distal end of the optical fiber and comprising a bevel, positioned at the second end of the endcap, circumscribing a facet; and
    a lens adapted for collimating a peripheral portion of the light beam that passes through the bevel and a central portion of the light beam that passes through the facet.

2. The apparatus of claim 1, wherein the endcap weighs less than 5 mg.

3. The apparatus of claim 1, wherein the bevel has an angle from the plane of the facet in the range of 1.9 degrees to 10.6 degrees.

4. The apparatus of claim 1, wherein the optical fiber core is surrounded by a cladding and wherein the facet is inclined to direct the light beam that is reflected from the facet towards the cladding.

5. The apparatus of claim 4, wherein the optical fiber and endcap are inclined to compensate for the incline of the facet.

6. The apparatus of claim 1, wherein the bevel has an angle from the plane of the facet to direct substantially all of the peripheral portion of the light beam towards the lens.

7. The apparatus of claim 1, wherein the endcap has a length and width and the endcap length and a width are selected to provide a wide range of bevel angles that direct substantially all of the peripheral portion of the light beam towards the lens.

8. The apparatus of claim 1, wherein the lens has a hexagonal shape.

9. The apparatus of claim 8, wherein the bevel comprises six flat, planar segments circumscribing the facet.

10. The apparatus of claim 1, wherein the lens has a semi-hexagonal shape.

11. The apparatus of claim 1, wherein the endcap is tapered to have a smaller diameter proximate the first end and a larger diameter proximate the second end.

12. The apparatus of claim 1, wherein the smaller diameter matches a diameter of the optical fiber.

13. The apparatus of claim 1, wherein the light beam is a Gaussian beam.

14. Apparatus for controlling propagation of a light beam comprising:
   an optical fiber adapted for propagating a light beam toward a distal end; the optical fiber has only a single core;
   an endcap comprising a first end and a second end, where the first end is coupled to the distal end of the optical fiber and comprising a bevel, positioned at the second end of the endcap, circumscribing a facet, wherein the endcap has a length and a width; and
   a lens adapted for collimating a peripheral portion of the light beam that passes through the bevel and a central portion of the light beam that passes through the facet, wherein the endcap length and width are selected to provide a range of bevel angles that direct substantially all of the peripheral portion of the light beam towards the lens.

15. The apparatus of claim 14, wherein the bevel has an angle from the plane of the facet in the range of 1.9 degrees to 10.6 degrees.

16. The apparatus of claim 15, wherein the optical fiber core is surrounded by a cladding and wherein the facet is inclined to direct the light beam that is reflected from the facet towards the cladding.

17. The apparatus of claim 16, wherein the optical fiber and endcap are inclined to compensate for the incline of the facet.

18. The apparatus of claim 14, wherein the endcap is tapered to have a smaller diameter proximate the first end and a larger diameter proximate the second end.

19. A method of controlling propagation of a light beam comprising:
   an optical fiber adapted for propagating a light beam toward a distal end; the optical fiber has only a single core;
   an endcap comprising a first end and a second end, where the first end is coupled to the distal end of the optical fiber and comprising a bevel, positioned at the second end of the endcap, circumscribing a facet; and
   a lens, positioned proximate the second end of the endcap; the method comprising:
   redirecting a peripheral portion of the light beam that passes through the bevel towards the lens; and
   directing a central portion of the light beam that passes through the facet towards the lens.

20. The method of claim 19, wherein the endcap has a length and width and the method further comprises selecting the endcap length and a width to provide a range of bevel angles that direct substantially all of the peripheral portion of the light beam towards the lens.

\* \* \* \* \*